Oct. 18, 1932.  E. D. RADER  1,882,895
MACHINE FOR AUTOMATICALLY PRODUCING AND ASSEMBLING SIGNATURES
Filed Oct. 18, 1928  10 Sheets-Sheet 1

Inventor
Earl D. Rader.
By
Cameron, Kerkam and Sutton.
Attorneys

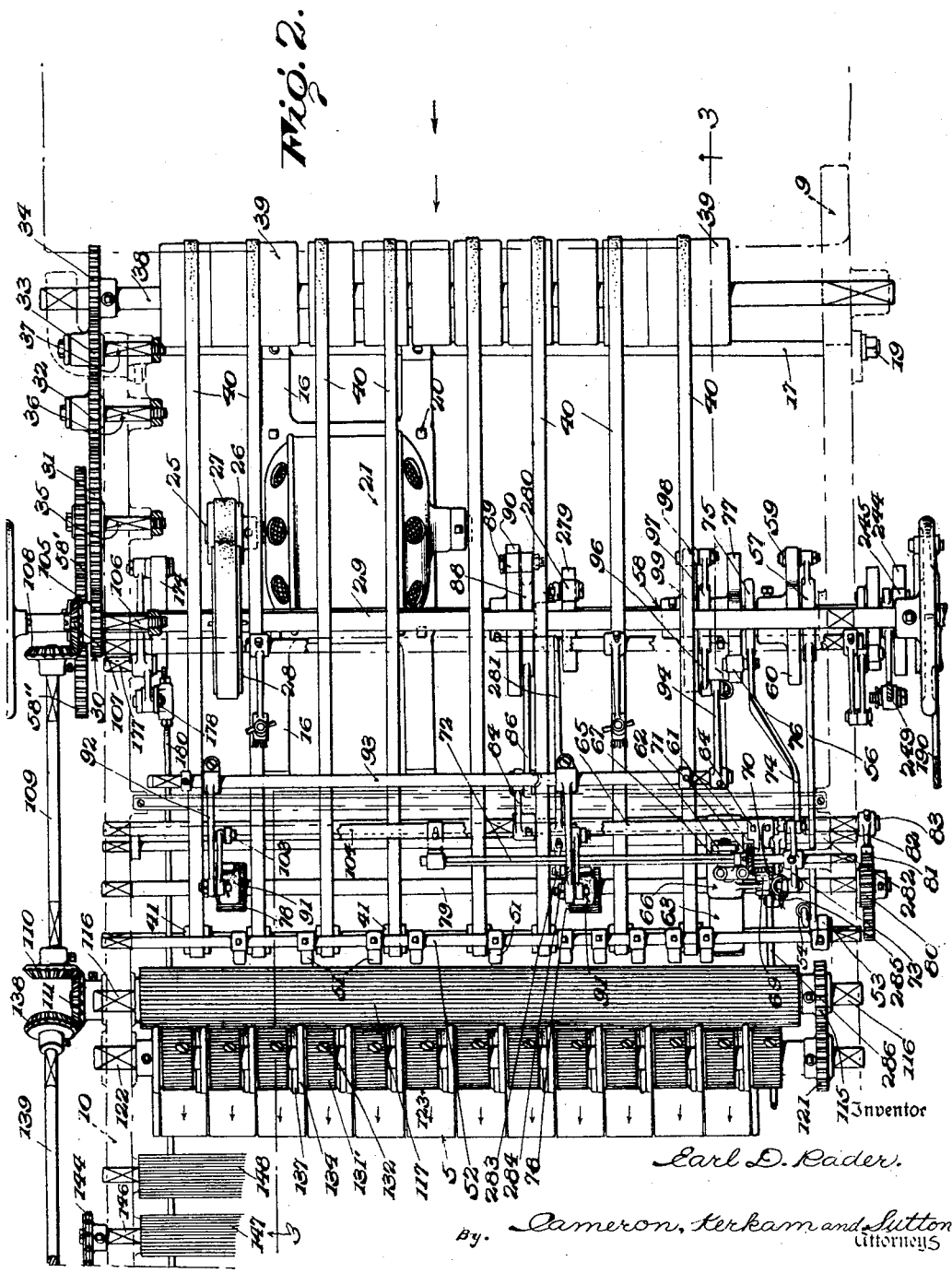

Oct. 18, 1932.   E. D. RADER   1,882,895
MACHINE FOR AUTOMATICALLY PRODUCING AND ASSEMBLING SIGNATURES
Filed Oct. 18, 1928   10 Sheets-Sheet 3
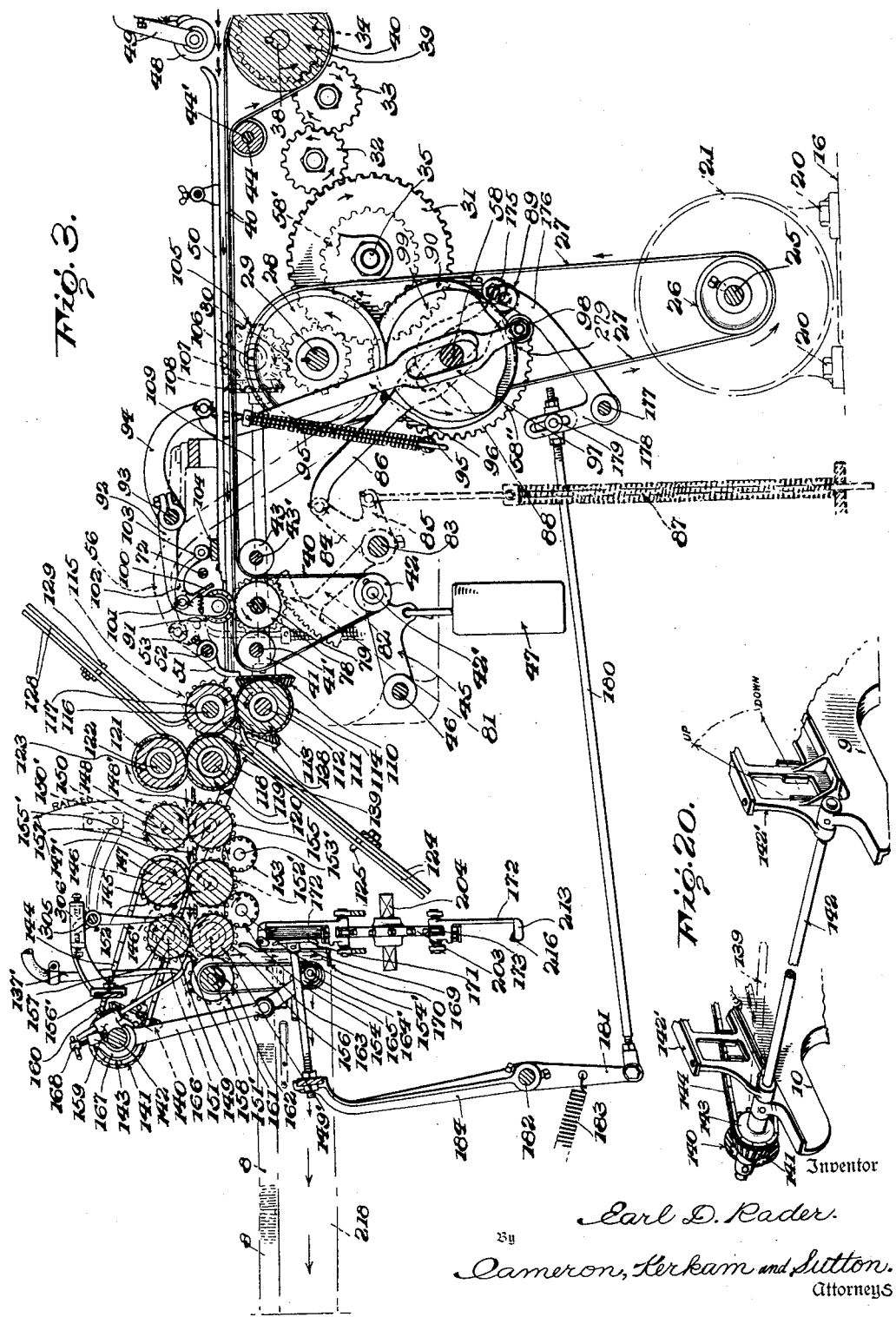
Inventor
Earl D. Rader
By
Cameron, Kerkam and Sutton.
Attorneys

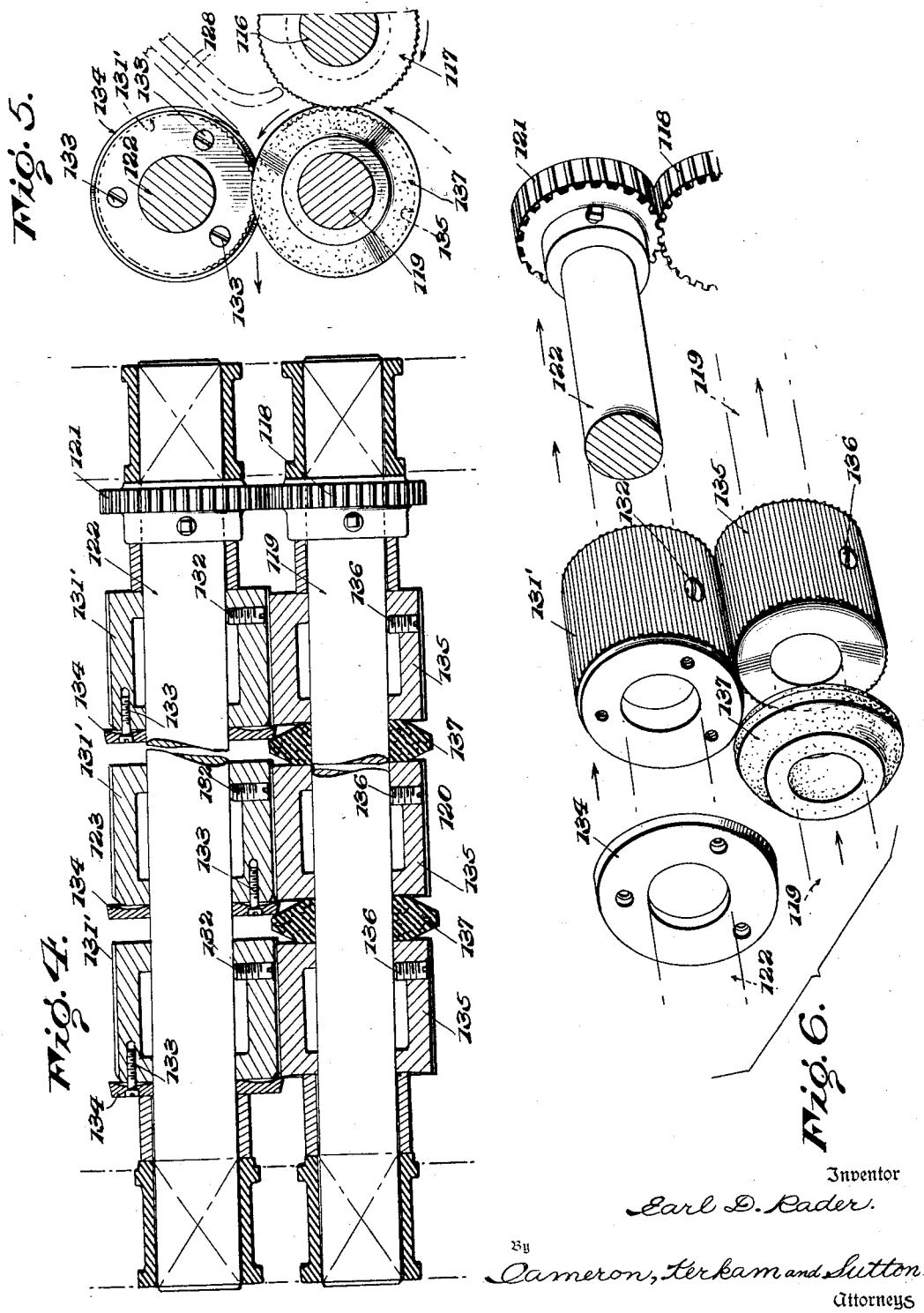

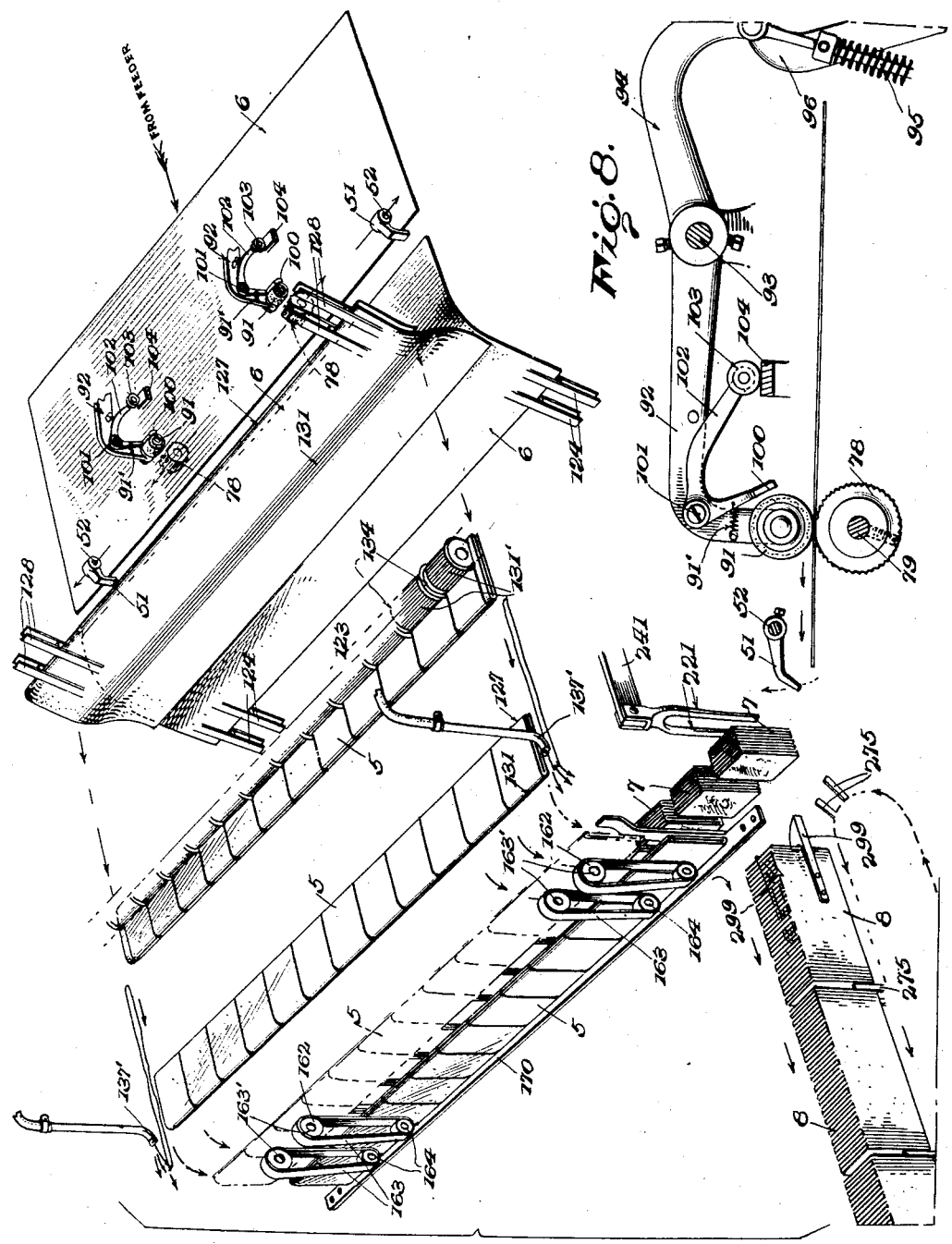

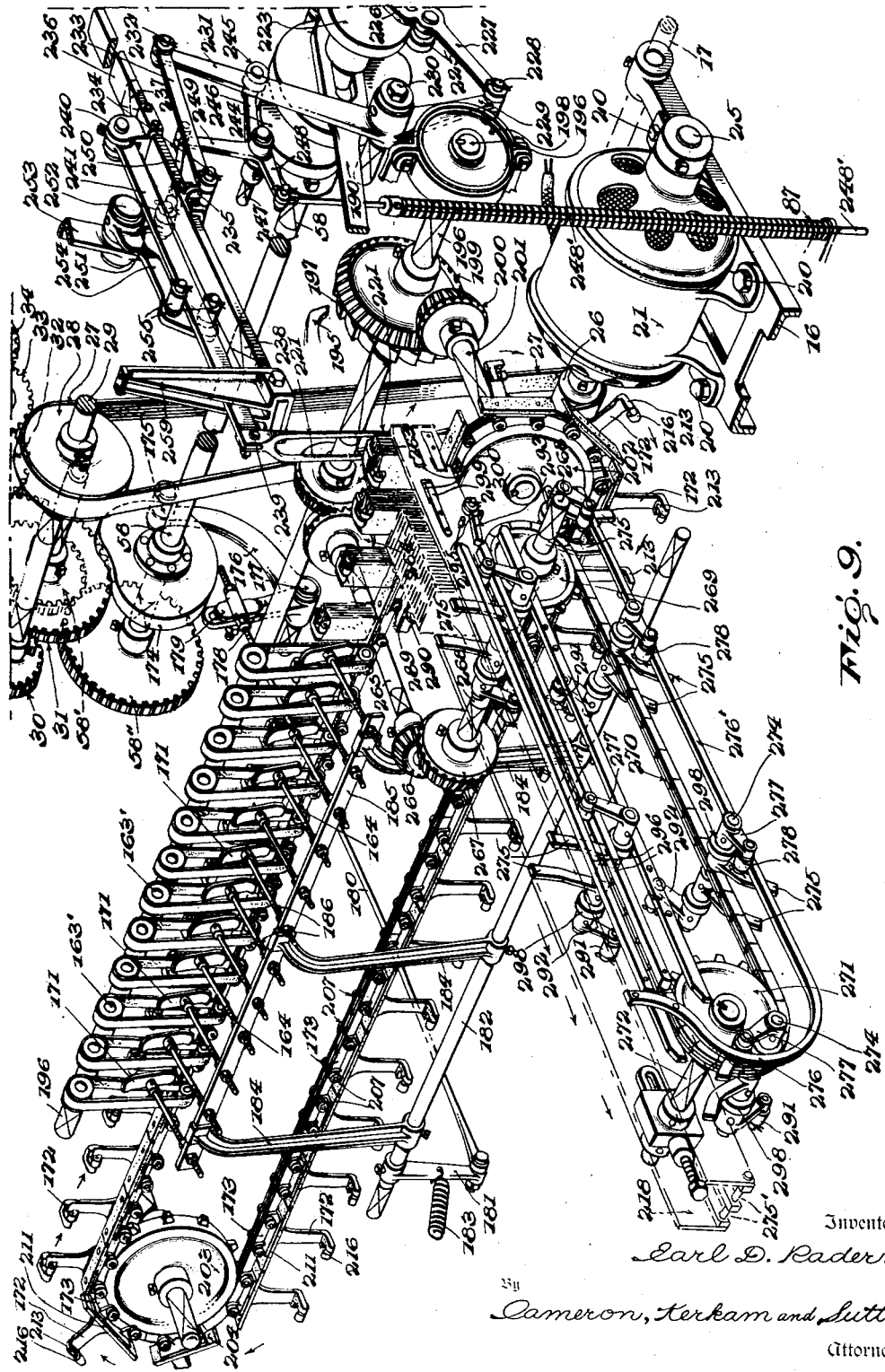

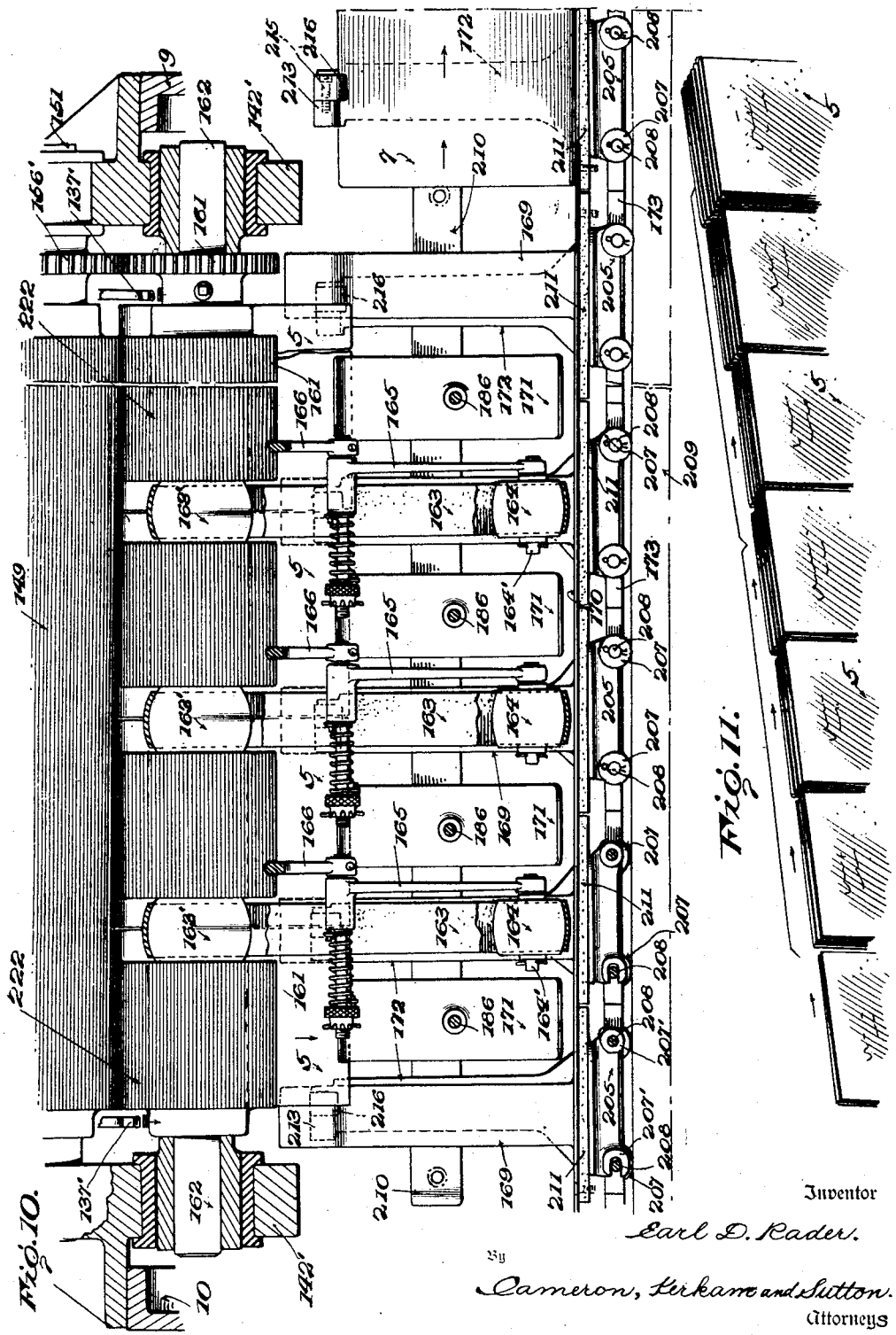

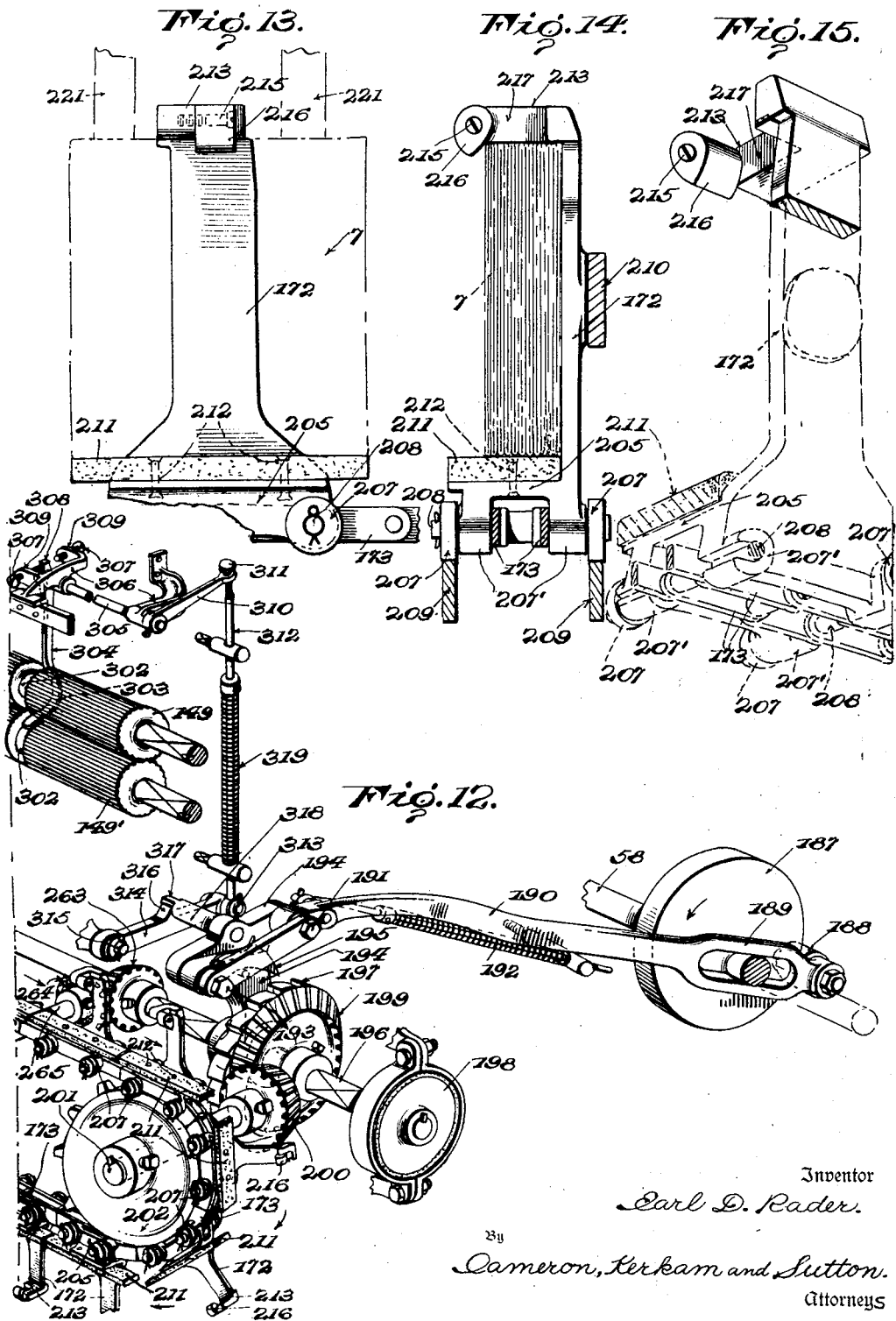

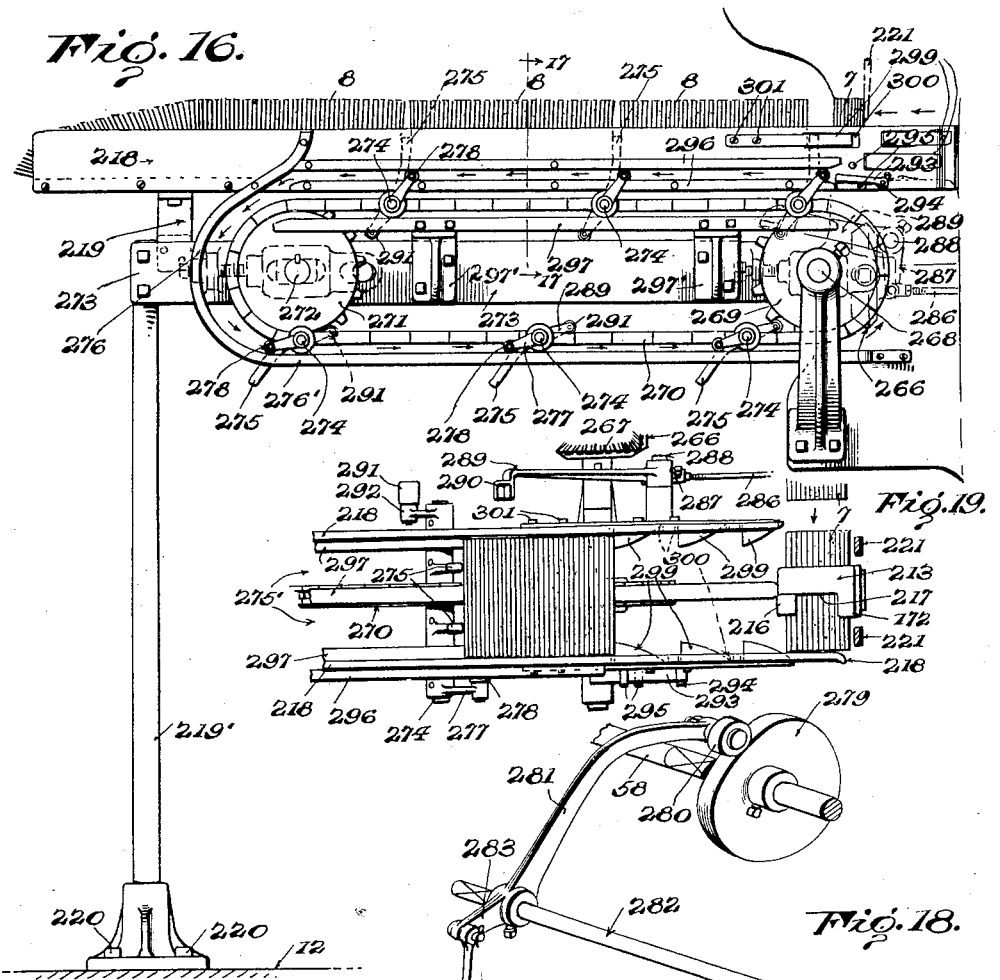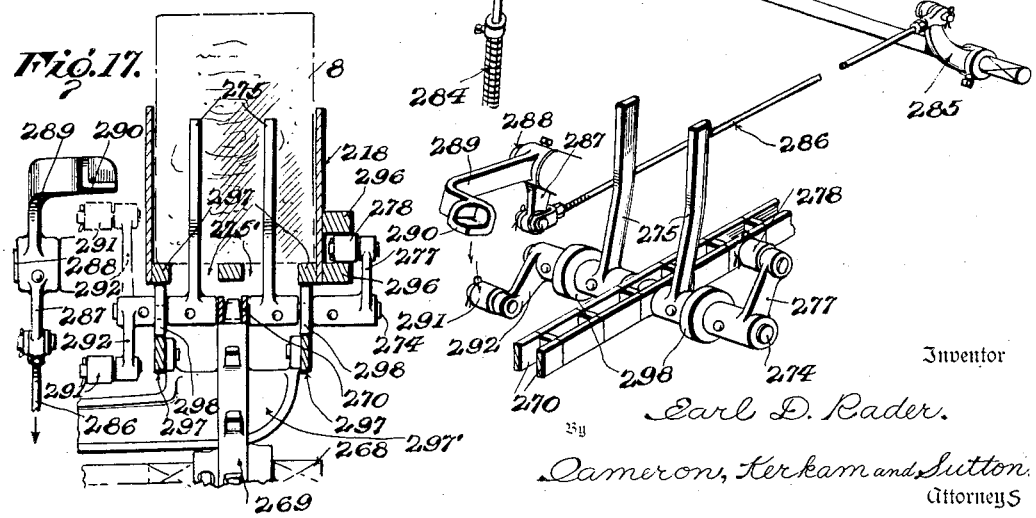

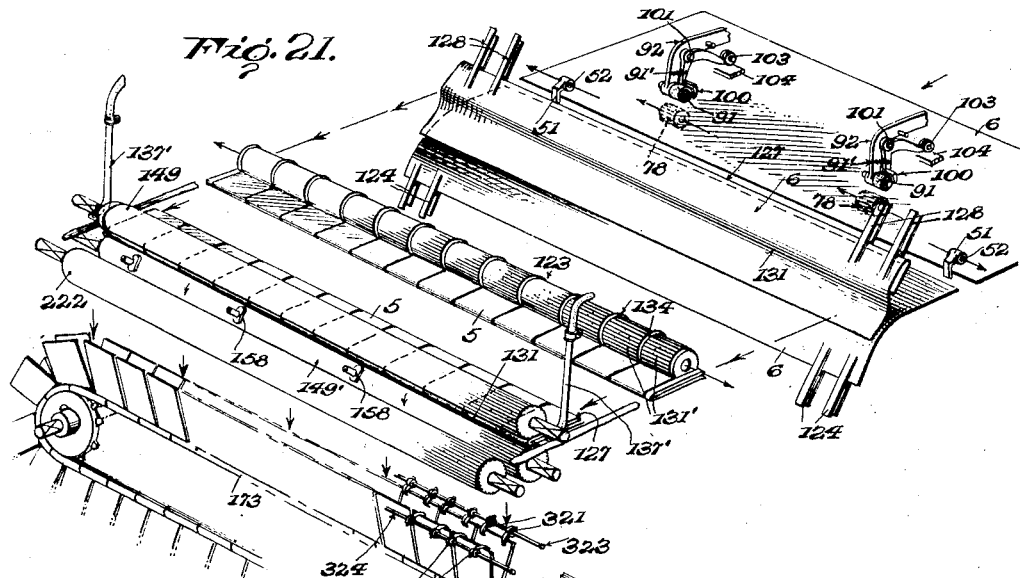
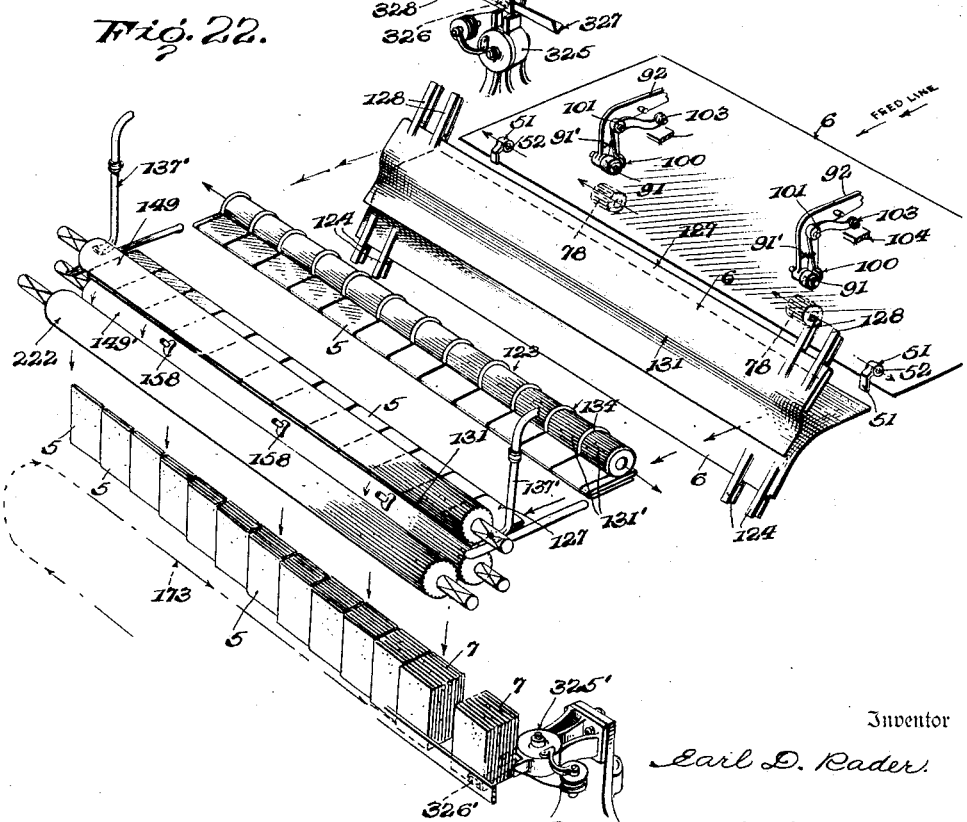

Patented Oct. 18, 1932

1,882,895

UNITED STATES PATENT OFFICE

EARL D. RADER, OF BEDFORD, NEW YORK, ASSIGNOR TO DEXTER FOLDER COMPANY, OF NEW YORK, N. Y., A CORPORATION OF NEW YORK

MACHINE FOR AUTOMATICALLY PRODUCING AND ASSEMBLING SIGNATURES

Application filed October 18, 1928. Serial No. 313,364.

This invention relates to folding machines, and the principal object of the invention is to provide a machine for feeding book sheets, subjecting them to a plurality of parallel folds, separating each sheet into a plurality of signatures and assembling said signatures into a book, phamphlet or the like.

A further object of the invention is to provide in such a machine mechanism to assemble the signatures into book form either by flat-gathering or inserting, and either to deliver the books with the signatures so flat-gathered or inserted, stitched or stapled, or otherwise as desired.

A further object of the invention is to provide a machine of this character in which the signatures so flat-gathered or inserted may be delivered from the machine without stapling and delivered to a sewing operator as book signatures, to be thereafter stitched together in book form.

A further object of the invention is to provide a machine of the character described which is particularly adapted for use in the automatic and expeditious production of calendar pads and the like, it being possible with a machine of the character described, in which four parallel folds are imparted to the signature sheet, to produce a complete calendar pad as the result of the operation thereof.

Another object of the invention is to provide a machine of this character which operates at much higher speed, and has a much greater productive capacity, than booklet folding machines heretofore proposed.

Another object of the invention is to provide a machine which produces packs of independent booklets arranged in sets for use by manufacturers of packaged goods.

Another object of the invention is to provide a machine which enables a set of booklets to be made from a single printed sheet and packed with booklets arranged in another set or sets likewise made from a single sheet or sheets.

Another object of the invention is to provide a machine which produces booklets in packs, each containing a plurality of sets arranged conveniently for association, by hand or by machinery, with packages of materials or articles.

Another object of the invention is to provide a machine which consecutively arranges and packs booklets in sets each comprising a plurality or series of informatively different booklets for association with packages of goods similar as respects the class thereof but different as respects ingredients of the same.

Other objects of the invention will appear as the following description thereof proceeds.

In order to more clearly understand the invention, reference may be had to the accompanying drawings which illustrate one embodiment of the inventive idea and wherein like reference characters designate like parts throughout the several views.

In said drawings—

Fig. 2 is a top plan view, with parts omitted, of the machine shown in Fig. 1;

Fig. 3 is a vertical, longitudinal sectional view approximately on the line 3—3 of Fig. 2.

Fig. 4 is a vertical, longitudinal sectional view of sheet cutting mechanism;

Fig. 5 is an end view of said mechanism;

Fig. 6 is a detail perspective view of parts of the sheet cutting mechanism separated for purposes of clearer illustration;

Fig. 7 is a detail perspective view, showing diagrammatically the various steps incident to formation of the packs of booklets;

Fig. 8 is a side elevation of parts of a sheet forwarding mechanism shown in Figs. 2 and 3;

Fig. 9 is an enlarged detail perspective view of gathering and packing mechanisms and operating devices therefor;

Fig. 10 is an enlarged front elevation, partly in section, of the gathering mechanism and associated devices shown in Figs. 3 and 9;

Fig. 11 is a detail perspective view illustrating diagrammatically the manner of gathering the booklets;

Fig. 12 is an enlarged detail perspective view of booklet detecting mechanism which controls the operation of the gathering and packing mechanisms;

Figs. 13, 14 and 15 are enlarged side, end and perspective views of the booklet receiving and transporting elements of the gathering mechanism;

Fig. 16 is an enlarged view in side elevation of the packing mechanism illustrated in Fig. 9;

Fig. 17 is a vertical, transverse sectional view on the line 17—17 of Fig. 16;

Fig. 18 is an enlarged detail perspective view of control devices for parts of the packing mechanism;

Fig. 19 is a diagrammatic plan view showing a trough and holding fingers;

Fig. 20 is a detail perspective view to more clearly show the swinging frame;

Fig. 21 is a view similar to Fig. 7, but showing the signatures assembled in inserted form rather than flat-gathered, and being stitched; and Fig. 22 is a detail showing a book of flat-gathered signatures being stitched.

Figure 1:
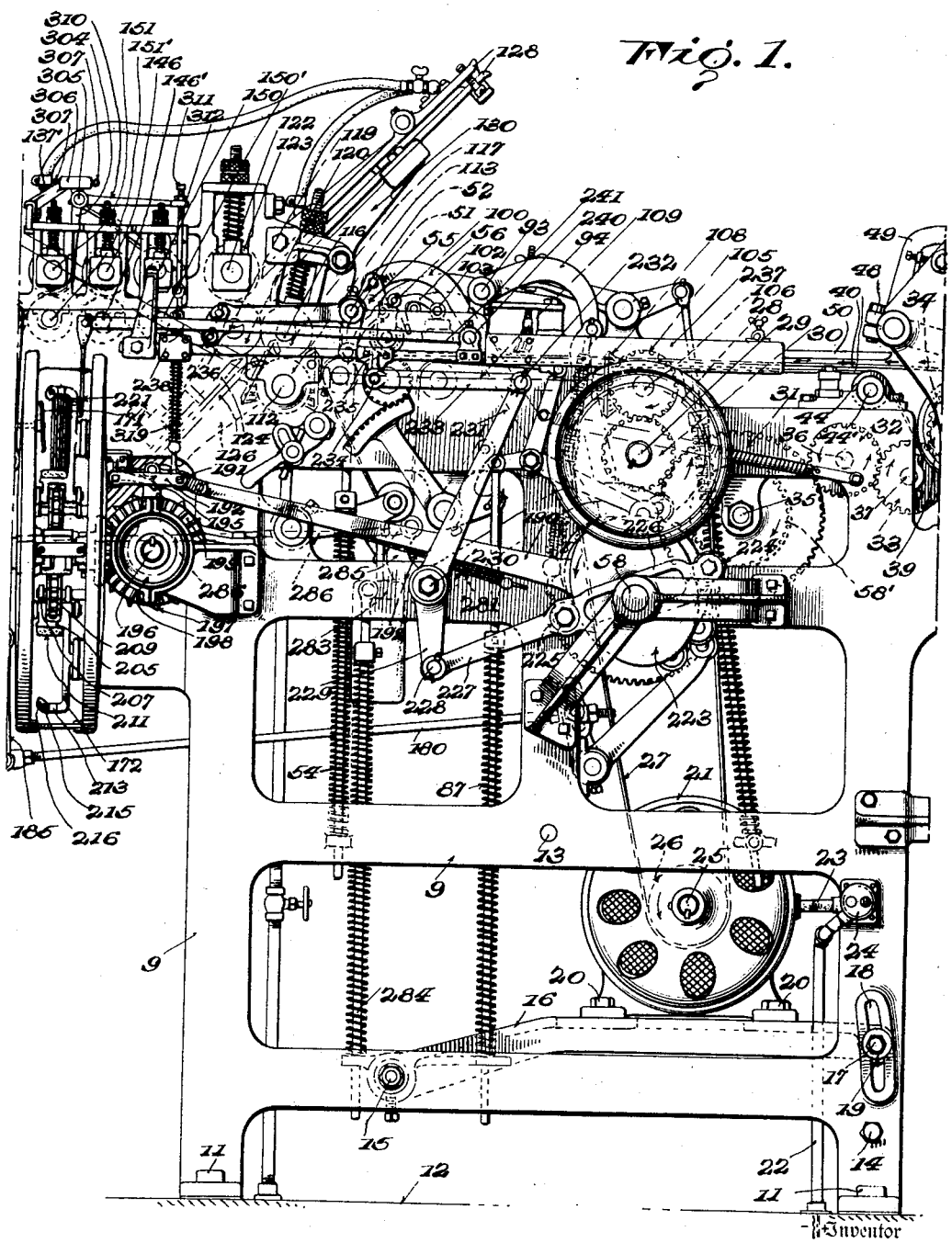
Fig. 1 is a side elevation, with parts omitted, of a machine embodying the present invention.

Referring to the drawings, and more particularly to Fig. 7, the booklets 5 are, in accordance with the present invention, made from single printed sheets 6 fed successively to a point where they are front and side registered before folding thereof. After each sheet is registered as aforesaid, it is forwarded, preferably at accelerated speed, to a point where the sheet is folded and cut into a plurality or series of signatures. Any desired number of signatures may thus be formed from a single sheet. As herein shown, the sheet is folded and cut into twelve signatures, but by any desired arrangement of the number of cutters and the speed of the gathering conveyor, this may be altered to produce signatures two, three or more up of varying sizes.

As the signatures are cut and folded, they are, as herein shown, advanced successively in series of twelve each to a point where groups or sets 7 of the signatures are successively gathered from the successively advanced series. Gathering of each set is preferably effected by advancing the first series of signatures transversely of the machine to a point where it is gathered with the second series of signatures and so on until the sets contain twelve signatures each taken from a different series at a different point. The groups or sets thus gathered are successively transferred to a point where they may be packed in pluralities of sets, the packs 8 being successively formed and intermittently advanced to a point where they are finally delivered successively from the machine. The packs 8 may each consist of any desired number of sets 7, and, as herein shown, each pack contains eighteen sets of twelve signatures each, making a total of two hundred and sixteen signatures to the pack.

While primarily the machine is adapted for the production and assembly of signatures in book or pamphlet form, in some cases the signatures of each series, or the successive series, may be duplicates as respects advertising matter or other information printed thereon. In other cases the signatures of each series, or the successive series, may be informatively different as when produced for association with packages of goods made up, prepared, and served in various ways. One class of such goods, for example, is a gelatinous food product that at present is made in several different flavors and sold to the trade in packages. In the case of booklets to be associated with packages of this product, it is desirable for purposes of advertising to produce sets of several booklets informatively different from each other and conveying various information relative to the several classes of the product, the idea being to associate only one booklet with each package and stimulate the sale of the product by the consumer's repeated purchases of packages of the goods in order to obtain a complete set of the booklets. In the case last mentioned, each sheet 6 will be printed, folded and cut into several booklets informatively different from each other. If these booklets are then gathered as above described, each group or set 7 will contain several informatively different booklets. Packs of these booklets supplied to the manufacturer can then be conveniently associated by hand or by machinery with packages of the gelatinous product so as to carry out the above mentioned scheme of advertising.

In any case, a machine constructed in accordance with the present invention may and preferably does embody sheet feeding, registering, folding, and cutting mechanisms, and signature advancing, gathering (or inseting), transferring, packing and detecting mechanisms, although certain of these may be omitted, or used singly, or in combination with others, according to the scope of the appended claims; and particularly the signatures so gathered or inset may be stapled or stitched together in the machine, or delivered in unstitched book form to a sewing operator. In the embodiment of the invention herein illustrated, all of the above referred to mechanisms are utilized. They will be described in the order named and are preferably constructed and operated as follows.

SHEET FEEDING MECHANISM

*Figs. 1 to 3 inclusive*

The sheets are supplied from any suitable source to the sheet feeding mechanism, and said mechanism, together with the other mechanisms hereinafter described, are preferably supported by a suitable framework comprising side frames 9 and 10 spaced apart and bolted or otherwise suitably secured at 11, 11, to the machine foundation 12 (Figs. 1 and 2). The side frames 9 and 10 are connected together by stay shafts 13, 14 and 15, the stay shaft 15 having pivotally mounted thereon a motor support 16, the free end of which carries a rod 17 that extends entirely across the machine.

The ends of the rod 17 extend through arcuate-shaped slots 18 formed in the side frames 9, 10, and said ends carry nuts 19 which bear against said frames and serve to hold the rod 17 in any desired position of adjustment along the slots 18. The motor support 16 has secured thereto at 20, 20 an electric motor 21 supplied with current from any suitable source through a conduit 22. This conduit 22 is flexibly connected, as at 23, with the motor 21, in order to provide for adjustment of the motor support 16 about its pivot 15 by means of the rod 17 and the nuts 19 carried on the ends thereof. This adjustment of the motor support is effected for the purpose of increasing or decreasing, as desired, the tension of a driving belt hereinafter referred to. The motor 21 serves to drive all of the various mechanisms of the machine, and said motor, and therefore said mechanisms, are preferably controlled by a switch 24 connected in the electrical current supply line and secured to the side frame 9 of the machine.

The shaft 25 of the motor 21 has fixed thereon a pulley 26 around which passes a driving belt 27. This belt 27 also passes around a pulley 28 that is fixed on a main driving shaft 29 extending transversely of the machine and journaled in suitable bearings on the side frames 9, 10 thereof. Fixed on the main driving shaft 29 is a spur gear 30 from which the sheet feeding mechanism is driven. This gear 30 meshes with a spur gear 31 which in turn meshes with a spur gear 32. The spur gear 32 meshes with a spur gear 33, which in turn meshes with a spur gear 34. The spur gears 31, 32, 33 are fixed on stub shafts 35, 36, 37 respectively which are journaled in suitable bearings on the side frame 10 (Fig. 2). The spur gear 34 is fixed on one end of a shaft 38 which extends transversely of the machine and is journaled in suitable bearings on the side frames 9, 10 thereof. This shaft 38 is driven through the aforesaid spur gears and has fixed thereon a feed roller 39 that is preferably made in sections adjustable along, and rigidly secured to, the shaft 38.

Passing over and driven by the roller 39 are a series of sheet conveying tapes 40 that serve to carry the sheets successively to sheet registering mechanism hereinafter referred to. These tapes 40 extend forwardly around pulleys 41 mounted on shaft 41', downwardly around tension pulleys 42 (Fig. 3), upwardly around pulleys 43, mounted on shaft 43', rearwardly over pulleys 44, mounted on shaft 44', and then downwardly and upwardly around the pulleys 39 mounted on shaft 38. The pulleys 41, 43, 44 are fixed to and adjustable along shafts 41', 43' and 44', respectively. These shafts extend transversely of the machine and are journaled in suitable bearings on the side frames 9, 10 thereof. The pulleys 42 are rotatably fixed on pins 42' which are journaled in the free ends of arms 45 adjustably secured to a shaft 46 that extends transversely of the machine and is journaled in suitable bearings on the side frames 9, 10 thereof. Secured to the arms 45 are weights 47 which tend to move the pulleys 42 downwardly and thereby take up the slack in the tapes 40.

The sheets are delivered in succession between the feed rollers 39 and drop rollers which are moved toward and away from the feed roller to engage the sheet with the tapes 40 and permit the feeding of successive sheets thereto. Each of these drop rollers 48 (Fig. 3) is carried on an arm 49 that is operated in a well-known manner to move the drop roller toward and away from the feed roller. Suitable top rods, such as indicated at 50, may be employed to prevent upward displacement of the sheets from the tapes 40. As each sheet is delivered to the tapes 40, it is fed forwardly thereby to be registered with respect to folding mechanism thereafter acting on the sheet.

SHEET REGISTERING MECHANISM

*Figs. 1 to 3 inclusive, and 7*

Each sheet, as it is advanced by the tapes 40, engages a series of fingers 51 which drop down into the path of travel of the sheet to stop and front register it with respect to the sheet folding mechanism. After the sheet is front registered, the fingers 51 are lifted, whereupon a sheet forwarding mechanism hereinafter referred to feeds the sheet into said sheet folding mechanism. The fingers 51 are fixed on a rockshaft 52 that extends transversely of the machine and is journaled in suitable bearings on the side frames 9, 10 thereof. Fixed on the rockshaft 52 is a bell crank, one arm 53 (Fig. 2) of which is pivotally connected with a spring-pressed rod 54 (Fig. 1). The other arm 55 (Fig. 1) of said bell crank is pivotally connected with one extremity of a cam operated link 56, which, together with the spring-pressed rod 54, serves to rock the shaft 52 and thereby raise and lower the fingers 51 at proper intervals during the operation of the machine. The free end of the link 56 is provided with a fork 57 (Fig. 2) that engages over a cam shaft 58 which extends transversely of the machine and is journaled in suitable bearings on the side frames 9, 10 thereof. This cam shaft is driven by a spur gear 58' (Fig. 3) which is fixed on the stub shaft 35 and meshes with a spur gear 58" that is fixed on said cam shaft. The fork 57 has journaled thereon a roller 59 (Fig. 2) which engages a cam 60 fixed on the cam shaft 58. This cam 60 imparts motion to the link 56, which, as before stated, acts in conjunction with the spring pressed rod 54 to rock the bell crank 53, 55 and the stop fingers 51.

After the sheet is front registered and before the fingers 51 are lifted, the sheet may be, and preferably is, side registered with respect to the sheet folding mechanism. The side registering mechanism may be of any suitable construction, but as herein shown is of the type disclosed in Patent No. 1,404,376, granted to C. E. Christophel and F. J. Eiserman, January 24, 1922. This side registering mechanism includes a reciprocating slide 61 (Fig. 2) and a cam operated roller 62 between which the sheet is engaged and then drawn laterally against a side stop (not shown) to side register the sheet. The slide 61 travels in a groove formed in a base plate 63 which is carried by a bracket 64 mounted on a cross bar 65 for adjustment therealong. This cross bar extends transversely of the machine and is secured in any suitable manner to the framework thereof. The roller 62 is carried by a cover plate 66 which is provided with a slot 67 through which the roller extends to engage the sheet with the slide 61.

The cover plate 66 is pivotally mounted on the bracket 64 and, together with said roller, is rocked toward and away from the slide 61 by a cam (not shown) that is operated through the medium of a lever 69 that also operates the slide 61. The lever 69 is journaled on the bracket 64 and oscillated by a bevel gear 70 which is formed integrally with said lever. Movement is imparted to the bevel gear 70 by a bevel gear 71 which meshes therewith and is secured to a rockshaft 72 for adjustment along the same. This rockshaft 72 is journaled in suitable bearings on the machine, and in turn is rocked by a spring-pressed arm 73 and a cam operated link 74. The arm 73 is fixed on one extremity of the rod 72 and one end of the link 74 is pivotally connected with said arm. The opposite extremity of the link 74 is provided with a fork 75 having journaled thereon a roller 76 that engages a cam 77 fixed on the cam shaft 58. This cam 77 acts at certain intervals to impart motion to the link 74 which, together with the spring pressed arm 73, rocks the shaft 72 and thereby operates the side registering mechanism as above described.

SHEET FORWARDING MECHANISM

*Figs. 1 to 3 inclusive, 7 and 8*

After the sheet is front and side registered, the fingers 51 are lifted and the sheet is forwarded, preferably at accelerated speed, to the sheet folding mechanism. The mechanism for forwarding the sheet preferably includes a pair of knurled rollers 78 (Fig. 2) secured to and adjustable along a shaft 79 which extends transversely of the machine and is journaled in suitable bearings on the side frames 9, 10 thereof. Fixed on the shaft 79 at one end thereof is a spur gear 80 (Fig. 2) that meshes with a segment 81 secured to an arm 82. This arm 82 is fixed on one extremity of a rockshaft 83 that extends transversely of the machine and is likewise journaled in suitable bearings on the side frames 9, 10 thereof. Fixed on the rockshaft 83 is a bell crank the arms 84 and 85 of which are pivotally connected with a cam operated link 86 and a spring-pressed rod 87 respectively (Fig. 3). The link 86 is provided with a fork 88 that extends over the cam shaft 58 and carries a roller 89. This roller 89 engages a cam 90 that is fixed on the cam shaft 58. This cam 90, together with the link 86 and the spring-pressed rod 87, acts to rock the bell crank 84, 85 so that the shaft 83 and the rack 81 are rocked in opposite directions and thereby rotate the rollers 78 in opposite directions. The cam 90 is so shaped that when the rack 81 is rocked in a clockwise direction (Fig. 3), the speed of said rack is accelerated and it acts to rotate the rollers 78 at accelerated speed in a counterclockwise direction.

The rollers 78 are disposed under and engaged by the sheet after it is front and side registered. When these operations have been performed, and the fingers 51 are lifted, the rollers 78 are, through the aforesaid driving means therefor, rotated in a counterclockwise direction and at accelerated speed, to carry the sheet forward to the sheet folding mechanism and deliver the sheet thereto at substantially the speed of rotation of the folding rollers. Drop rollers 91 (Fig. 2) are preferably provided to positively engage the sheet with the sheet forwarding rollers 78. These drop rollers are journaled on arms 92 which are fixed in spaced relation on a rockshaft 93 that extends transversely of the machine and is journaled in suitable bearings on the framework thereof.

Fixed on one end of the rockshaft 93 is an arm 94 that is rocked back and forth by a spring-pressed rod 95 and a cam operated link 96 both pivotally connected with said arm (Fig. 8). The link 96 is provided with a fork 97 that engages over the cam shaft 58 and carries a roller 98. This roller 98 engages a cam 99 that is fixed on the cam shaft 58 and serves to operate the link 96. The cam 99 is shaped so that when the fingers 51 are raised and the rollers 78 begin to rotate in a counterclockwise direction, the rollers 91 will be lowered onto the sheet and press it into engagement with the rollers 78 so that the latter feed the sheet rapidly to the sheet folding mechanism. When the sheet has passed into engagement with the folding rollers, rollers 91 are lifted. After the sheet has passed into the folding rollers, the fingers 51 are dropped to provide for registration of the next sheet.

When each roller 91 is lifted, rotation of the same is stopped by one arm 100 of a bell crank that drops by gravity into engagement with said rollers (Fig. 8) or a spring 91' may be used to assist the braking action. This bell crank is pivoted at 101 on the arm 92 and the other arm 102 of said bell crank is weighted and carries a roller 103. When the arm 92 is lowered so that the roller 91 engages the rollers 78, the roller 103 engages a fixed stop 104, thereby rocking the bell crank 100, 102 in a counterclockwise direction about its pivot 101 and moving the arm 100 out of engagement with the roller 91.

SHEET FOLDING MECHANISM
*Figs. 1, 3 and 7*

The sheet folding mechanism is of the loop or buckle type and its movable parts are driven at high speed by a train of gearing connected with the spur gear 30 that is fixed on the main driving shaft 29 (Figs. 2 and 3). This spur gear meshes with a similar gear 105 (Fig. 3) that is fixed on a stub shaft 106 journaled in a suitable bearing on the side frame 10 of the machine. Fixed on the stub shaft 106 is a bevel gear 107 which meshes with a bevel gear 108 that is fixed on one end of a shaft 109 journaled in suitable bearings on the side frame 10 of the machine. Fixed on the opposite end of the shaft 109 is a bevel gear 110 that meshes with a bevel gear 111 which is fixed on a shaft 112 that extends transversely of the machine and is journaled in suitable bearings on the side frames 9, 10 thereof. The shaft 112 has fixed thereon a knurled feed roller 113 and a spur gear 114. The spur gear 114 meshes with a spur gear 115 (Fig. 2) that is fixed on a shaft 116 which extends parallel with the shaft 112 and carries a knurled feed roller 117.

This shaft 116 is journaled in suitable bearings on the side frames 9, 10 of the machine, and the spur gear 115 carried by said shaft meshes with the spur gear 118 that is fixed on a shaft 119 which extends parallel with the shaft 116. The shaft 119 is journaled in suitable bearings on the side frames 9, 10 and carries a knurled roller 120 which is keyed or otherwise rigidly secured to said shaft. The spur gear 118 meshes with a spur gear 121 that is fixed on a shaft 122 which extends transversely of the machine and is journaled in suitable bearings on the side frames 9, 10 thereof. This shaft 122 has fixed thereon a knurled roller 123 which, together with the rollers 113, 117 and 120, serves to feed and fold the sheets delivered thereto by the sheet forwarding mechanism.

When the fingers 51 are raised, the sheet forwarding mechanism advances the registered sheet into the bite of the feed rollers 113 and 117, which then feed the sheet downwardly between a pair of spaced plates 124 until the leading edge of said sheet strikes a stop 125 adjustably mounted on said plates between the same and extending transversely thereof. These plates are inclined forwardly and downwardly, and said plates constitute a grid secured to and supported at each side by brackets 126 (Fig. 1) mounted on the side frames 9, 10 of the machine.

When the leading edge of the sheet strikes the stop 125, said sheet is buckled and folded along the line 127 (Fig. 7) by the rollers 117, 120 which then act to feed the once folded sheet upwardly between a pair of spaced plates 128 until the folded edge 127 of the sheet strikes a stop 129 adjustably mounted on the plates 128 and extending transversely thereof. The plates 128 are inclined upwardly and rearwardly and the grid comprised by said plates is secured to and supported at each side by brackets 130 (Fig. 1) mounted on the side frames 9, 10 of the machine. When the folded edge 127 of the sheet 6 strikes the stop 129, said sheet is buckled and again folded along the line 131 (Fig. 7) by the rollers 120, 123 which then act to feed the twice folded sheet out of the loop folding mechanism just described. If desired additional folding grids and rollers could be employed to make additional folds in the sheet.

SHEET CUTTING MECHANISM
*Figs. 1 to 7 inclusive*

Preferably the rollers 120, 123 which impart the final fold to the sheet 6, also serve to cut the finally folded sheet into a series of booklets 5. The rollers 123 are accordingly made in knurled sections 131' (Fig. 4) adjustably secured in spaced relation on the shaft 122 by machine screws 132, and each of said sections has secured to one end thereof, as by machine screws 133, a rotary cutter 134. The roller 120 is also made in knurled sections 135 that are adjustably secured on the shaft 119 by machine screws 136. Between the knurled sections 135 are placed rubber washers 137 frictionally secured to shaft 119. The roll sections 135 and the washers 137 are placed in alternate relation on the shaft 119 so that said washers are clamped between said sections and rotate therewith with the cutters 134. The washers facilitate the feeding of the signatures to the cutters when paraffined stock is used.

The folded sheet 6, as herein shown, is cut into twelve booklets as clearly shown in Fig. 7. Accordingly, thirteen roll sections 131' are fixed on the shaft 122 and each of said sections carries a cutter 134 spaced from the adjacent cutter or cutters a distance corresponding with the width of the booklet to be cut. The two end cutters 134, as clearly shown in Fig. 7, serve to trim the side edges of the folded sheet as it is being cut into booklets, and the trimmed edges of the sheet are blown or deflected away from the machine by blasts of air supplied from any suitable source through a pair of nozzles 137', 137' located one at each side of the machine and suitably supported on the framework thereof.

BOOKLET ADVANCING MECHANISM
*Figs. 1 to 3 inclusive, 7, 9, and 10*

The folded and cut signatures are delivered successively in series from the folding and cutting mechanisms to an advancing mechanism the movable parts of which are driven by a train of gearing connected with the bevel gear 111 (Fig. 2) which is attached to and drives roller 113. The bevel gear 111 meshes with a similar gear 138 which is fixed on one end of a shaft 139 that is journaled in suitable bearings on the side frame 10 of the machine. Fixed on the opposite end of the shaft 139 is a bevel gear 140 which meshes with a bevel gear 141 (Fig. 3) that is fixed on a stay shaft 142. The stay shaft 142 extends transversely of the machine and is journaled in suitable bearings on the framework thereof. Compounded with gear 141 is a sprocket 143 around which passes a chain 144. This chain also passes around a sprocket 145 that is fixed on a shaft 146 which extends towards the machine and is journaled in suitable bearings on the swinging brackets 142' (Fig. 20).

The shaft 146, through an intermediate train of gears, serves to drive spaced pairs of knurled booklet advancing rollers 147, 147', 148, 148', 149, 149', the roller 147' being mounted on a shaft 146' parallel with the shaft 146 and journaled therebelow in suitable bearings on the swinging brackets 142'. The rollers 148, 148' and 149, 149' are mounted on shafts 150, 150' and 151, 151' respectively, extending in superposed parallel relation transversely of the machine and journaled in suitable bearings on the swinging brackets 142'. The described mounting of the rollers 147, 147', 148, 148', 149, 149', enables them to be swung upwardly with the brackets 142' to inoperative positions when it is desired to have access to the sheet folding mechanism and the hereinafter described signature gathering mechanism. Fixed on the shaft 146 is a spur gear 152 that meshes with a spur gear 152' which is fixed on the shaft 146' and thus serves to drive the roller 147'.

The spur gear 152' meshes with idler gears 153 and 154 which are loosely mounted on stub shafts 153' and 154' extending parallel with each other and carried by the swinging brackets 142. The idler gear 153 meshes with a gear 155 which is fixed on the shaft 150', and thus serves to drive the roller 148'. The gear 155 meshes with a gear 155' fixed on the shaft 150, and thus serves to drive the roller 148. The idler gear 154 meshes with a gear 156 fixed on the shaft 151', and thus serves to drive the roller 149'. The gear 156 meshes with a gear 156' fixed on the shaft 151, and thus serves to drive the roller 149.

As each series of signatures is finally folded and cut by the rollers 120, 123, said series passes through the spaced pairs of advancing rollers over plates 157 which extend transversely of the machine between said rollers and are bolted or otherwise suitably secured to the swinging brackets 142'. As each series is advanced past the rollers 149, 149', said series strikes a sheet deflector 158 arranged transversely of the machine and adjacent the periphery of the roller 149'. The sheet deflector 158 deflects the series of signatures downwardly to gathering or insetting mechanism hereinafter described, and said deflector is carried by brackets 159 adjustably secured to the shaft 142, as by set screws 160.

The gear 156 meshes with a gear 161 that is fixed on a shaft 162 extending transversely of the machine and journaled in suitable bearings on the swinging brackets 142'. On shaft 162 are supported sections of knurled rollers 222 that engage the series of signatures and insure the downward feeding of the signatures thereof. A series of vertically arranged belts or tapes 163 that pass over and are driven by rollers 163', fixed on the shaft 162, also pass over pulleys 164 that are journaled on shafts 164'. The shafts 164' are supported on the ends of spring-pressed arms 165 pivotally mounted on the lower ends of rods 166, provided at their upper ends with brackets 167 that are adjustably secured on the shaft 142, as by machine screws 168.

As each series of signatures strikes the deflector 158, said series is deflected into the bite of the roller 149' and the tapes 163, and said roller and said tapes act to feed the series downwardly between the tapes and a series of vertically extending fingers 169 arranged in spaced relation transversely of the machine and secured to or formed integrally with a transversely extending horizontal plate 170 on which the signatures are delivered and supported vertically. This plate 170 extends parallel with the gathering mechanism and is bolted or otherwise suitably secured to the side frames 9, 10 of the machine.

SIGNATURE GATHERING MECHANISM
*Figs. 1, 3, 7 and 9 to 15 inclusive*

The signatures 5 delivered vertically onto the plate 170 are pushed rearwardly therefrom by a series of spaced, vertical pusher plates 171 (Figs. 9 and 10) onto the flights 172 of an intermittently driven endless conveyor 173. The pusher plates 171 extend in line transversely of the machine and move rearwardly and forwardly thereof across the plate 170 and between the belts 163 and the fingers 169. The conveyor 173 is arranged transversely of the machine and to the rear of the plate 170, and said conveyor and said pusher plates are operated in timed relation such that when the plates move rearwardly the conveyor is at rest and when the plates move forwardly the conveyor is advanced one step across the machine a distance substantially equal to the width of one of the booklets 5.

Each time the plates 171 move forwardly and the conveyor is advanced a step further, a series of signatures 5 is delivered onto the plate 170, and when the plates 171 then move rearwardly each of the signatures of the series is pushed by one of said plates onto one of the conveyor flights 172. The pusher plates 171 then move forwardly and the conveyor is advanced another step, whereupon said plates move rearwardly and each push a signature of the next series onto one of the flights 172 carrying a signature pushed thereon from the preceding series at the preceding position of said flight. These operations are repeated so that as each conveyor flight 172 reaches a position adjacent transferring mechanism hereinafter described, said flight carries a set of signatures 7 each taken from a different series at a different point and, if desired, informatively different from each other as above pointed out.

The pusher plates 171 are operated in timed relation with the conveyor 173 by a cam 174 and connections between said cam and said pusher plates. This cam 174 (Figs. 2 and 9) is fixed on the cam shaft 58 and engages a roller 175 journaled on one arm 176 of a bell crank that is pivoted at 177 to a fixed part of the machine. The other arm 178 of said bell crank is adjustably connected at 179 with one extremity of a rod 180 the opposite end of which is pivotally connected with an arm 181 that is fixed on a rockshaft 182 extending transversely of the machine and journaled in suitable bearings on the side frames 9, 10 thereof.

A spring 183 has its opposite ends connected with the arm 181 and a stationary part of the machine respectively, and said spring acts in conjunction with the cam 174 to rock the bell crank 176, 178 and the shaft 182 through the described connections between said shaft and said bell crank.

Fixed on the rockshaft 182 are arms 184 to the upper ends of which are secured a bar 185 that extends transversely of the machine in substantially parallel relation with the rockshaft 182. This bar 185 has adjustably mounted thereon at intervals a series of rearwardly extending rods 186 each having secured thereon one of the pusher plates 171. It will thus appear, that, when the shaft 182 is rocked, the arms 184 will also be rocked, thus reciprocating the pushers 171 rearwardly and forwardly of the machine as above described.

The conveyor 173 is operated in timed relation with the pusher plates 171 by a cam 187 and connections between said cam and said conveyor. The cam 187 (Fig. 12) is fixed on the cam shaft 58 and engages a roller 188 which is journaled on a strap 189 engaged over the cam shaft 58 and formed on one end of a link 190. The opposite end of the link 190 is pivotally connected at 191 with a stud that is attached to the pawl carrier arm 194. This pawl carrier arm 194 has a stud 193 on which is pivoted a pawl 195 and said pawl carrier is loosely mounted on a shaft 196 that extends transversely of the machine and is journaled in suitable bearings on the side frames 9, 10 thereof. In the normal operation of the machine, the link 190 and pawl carrier arm 194 are reciprocated together by the cam 187. On each rearward stroke of the link 190 and pawl carrier arm 194, which is carried by the spring 192, the pawl 195 engages a tooth of a ratchet 197 that is fixed on the shaft 196, engagement of said pawl with said ratchet acting to intermittently drive the shaft 196 which ordinarily is prevented from rotating or overrunning by a friction brake 198 of well known construction.

Fixed on the shaft 196 is a bevel gear 199 which meshes with a bevel gear 200 that is fixed on a shaft 201 journaled in suitable bearings on the side frame 9 of the machine and having fixed thereon a sprocket 202. The endless conveyor 173 comprises a chain which passes around the sprocket 202 and also around a sprocket 203 (Fig. 9) that is fixed on a shaft 204 journaled in suitable bearings on the side frame 10 of the machine. The ratchet 197 and the cam 187 are so constructed that when the pawl 195 engages a tooth of said ratchet to partially rotate the shaft 196 and the bevel gear 199, the conveyor chain 173 will, through its connections with said bevel gear, be moved so that each flight on the upper reach of said chain moves a distance corresponding substantially to the width of one of the booklets 5.

In accordance with the present invention, the conveyor flights 172 are constructed to hold the signatures and at the same time provide for movement of the signatures onto and off the flights by the pushers 171 and the transferring mechanism respectively. The base 205 is provided with spaced rollers 207 which are secured by pins 208 to the links of the conveyor chain 173. Mounted on the side frames 9, 10 of the machine and extending transversely thereof are rails 209 and a guide 210 (Fig. 14). Said rails and said guide support the upper reach of the chain 173 to prevent sagging thereof and maintain the flights of said upper reach in proper position with respect to the booklet supporting plate 170. The base 205 of each conveyor flight 173 is provided with rivets 212 that extend upwardly through said base 205 and carry on their upper ends leather plates 211.

Each conveyor flight 172 has extending forwardly from the upper end thereof a shoulder 213. Mounted on the forward end of the shoulder 213 is a laterally extending pin 215 which carries a detent 216 past which each signature moves as it is pushed onto the plate 211 by one of the pusher plates 171. This detent may be adjusted as desired within a cutaway portion 217 of the shoulder 213. As the signatures or booklets are pushed onto the conveyor flight by the pushers 171, the tops and bottoms of said signatures are engaged by the shoulder 213 and the leather plate 211 which coact to frictionally hold the signatures or booklets on the conveyor flight until a complete set of the signatures or booklets is pushed thereon. Also 216 acts to prevent the booklets from falling back. When the first signature or booklet is delivered onto the conveyor flight, it may not be pushed entirely to the rear thereof. This booklet, however, as well as the succeeding booklets delivered onto the conveyor flight will be held by the pad 211 and the arm 213 sufficiently to prevent displacement of the books from the flight while at the same time permitting the booklets to move rearwardly thereon as they are successively pushed onto the flight.

SIGNATURE OR BOOKLET TRANSFERRING MECHANISM

*Figs. 1, 2, 7, 9 and 16*

The flights 172 of the conveyor 173 successively move to and stop for a predetermined interval at the rear end of a trough or packer box 218 which extends forwardly of the machine and is bolted or otherwise suitably secured to the side frame 9 thereof. The forword end of this trough is secured to rail 273 by a bracket 219, and this in turn is secured to a vertical support 219' (Fig. 16) that is bolted or otherwise suitably anchored at 220 to the machine foundation 12. As each flight reaches the rear end of the trough 218, it stops in front of a pusher 221 (Fig. 7)

The pusher 221 then moves forwardly and carries the set of booklets along the trough 218 to a point where they are positioned back of an element of a packing mechanism that travels along said trough. The pusher 221 then moves rearwardly and upwardly until it crosses the path of travel of the conveyor 173, then downwardly behind the set of booklets on the next conveyor flight which has advanced to and stopped in front of the pusher 221. This set of signatures or booklets is transferred as above, the pusher 221 operating in the manner stated to successively transfer sets of signatures or booklets from the conveyor flights 172 as the latter are successively moved to and stopped momentarily at the rear end of the trough 218.

The pusher 221 is reciprocated longitudinally of the machine by a cam 223 (Figs. 1 and 9) and connections between said cam and said pusher. The cam 223 is fixed on the cam shaft 58 between a pair of spaced rollers 224, 225 (Fig. 1) that engage said cam and are journaled at the opposite ends of a strap 226 through which the cam shaft 58 passes. The strap 226 is formed on one end of a link 227 the opposite end of which is pivotally connected at 228 with one arm of a bell crank 229 that is pivotally mounted at 230 on the side frame 9 of the machine. The other arm 231 of this bell crank is pivotally connected at 232 with one end of a link 233 the opposite end of which is pivotally connected at 234 with a bracket 235 that is bolted or otherwise suitably secured to a slide 236 (Fig. 9).

The slide 236 is reciprocated by the described connections therefor with the cam 223, in a pair of spaced guides 237 and 238 (Fig. 1) which are mounted on and secured to the side frame 9 of the machine. The pusher 221 depends from and is secured at 239 to the forward end of the raising and lowering bar 241. This bar is pivotally secured to slide 236 by a bracket 240 at its rear end and at the forward end a slide guide bracket 259. It will thus appear that when the slide 236 is reciprocated, the bar 241 will also be reciprocated, and the pusher 221 will travel forwardly and rearwardly and up and down as above described.

During forward and rearward movement of the pusher 221, it is raised and lowered, as by a cam 244 and connections between said cam and the pusher 221. This cam 244 (Fig. 9) is fixed on the cam shaft 58 and engages a roller 245 that is journaled on an arm 246 rigidly secured to a stub shaft 247 journaled in suitable bearings on the side frame 9 of the machine. Fixed on the stub shaft 247 is a bell crank, one arm 248 of which is pivotally connected with a spring-pressed rod 248'. The other arm 249 of said bell crank is pivotally connected with a link 250 that is also pivotally connected with one arm 251 of a bell crank that is pivoted at 252 on a bracket 253 or other stationary part of the machine. The other arm 254 of the last named bell crank has journaled thereon in spaced relation a pair of rollers 255 which engage the bar 241 at opposite sides thereof and raise and lower said link as the bell crank 248, 249 is rocked by the cam-operated arm 246 and the spring-pressed rod 248'.

The cam 244 is shaped so that when the slide 236 is moved forwardly and rearwardly, the pusher 221 will be raised and lowered respectively.

SIGNATURE OR BOOKLET PACKING MECHANISM

*Figs. 3, 7, 9, 12, and 16 to 18 inclusive*

The signature or booklet packing mechanism is intermittently driven in timed relation with the intermittently driven conveyor 173, and for this purpose there is fixed on the shaft 196 a bevel gear 263 which meshes with a bevel gear 264 that is fixed on one end of a shaft 265. The shaft 265 extends longitudinally of the machine and is journaled in suitable bearings on the side frame 9 thereof. Fixed on the opposite end of the shaft 265 is a bevel gear 266 which meshes with a bevel gear 267 that is fixed on a shaft 268 extending transversely of the machine and journaled in suitable bearings on the side frame 9 thereof. The shaft 268 has fixed thereon a sprocket 269 around which passes a chain 270 that also passes around a sprocket 271 which is fixed on a shaft 272 journaled on a frame 273 (Fig. 16) and extending transversely of the machine in parallel relation with the shaft 268. One end of the frame 273 is bolted or otherwise suitably secured to the side frame 9 of the machine and the opposite end of said frame is likewise secured to the support 219'.

The chain 270 is disposed below the trough 218 and journaled on said chain at intervals along the same are shafts 274 each having operably secured thereto a pair of packing fingers 275. The pairs of packing fingers 275 pass successively along the trough 218 through suitable openings 275' (Fig. 17) in the bottom of the trough. While passing along said trough, the fingers 275 stand vertically and the booklets 5 are packed between them in packs each containing, in the embodiment illustrated, two hundred and sixteen booklets arranged consecutively in sets as above pointed out.

Each pair of fingers on reaching the sprocket 271 turn downwardly and rearwardly therearound through the slots 275' of the trough 218, and the pack of booklets that has been engaged back of said pair of fingers is removed from the front of the trough by an attendant. As each pair of packing fingers 275 passes around the sprocket 271 said fingers are turned in a clockwise direction, as viewed in Fig. 16 by a cam 276. The cam 276 is formed integrally with the bar 276' and extends rearwardly and horizontally to the side frame 9 on which it is bolted or otherwise suitably secured. Each of the shafts 274 which carry the packing fingers 275 has fixed thereon a crank arm 277 on which is journaled a roller 278 that first engages the cam 276 at a point adjacent the sprocket 271. On continued travel of the chain 270, the cam 276 acting on the roller 278 turns the crank arm 277 in a clockwise direction thereby turning the pair of fingers 275 in the same direction and holding them turned until they reach the sprocket 269. At this point the roller 278 passes off the cam 276 and the packing fingers 275 depend vertically from the chain 270 and are carried upwardly thereby around the sprocket 269.

As the packing fingers 275 turn around the sprocket 269, they are turned upwardly through the bottom of the trough 218 and stand vertically therein. This upward turning movement of the packing fingers is effected by a cam 279 (Fig. 18) and devices operated thereby that act on said fingers to turn them upwardly as stated. The cam 279 bears downwardly on a roller 280 which is journaled on an arm 281 that is rigidly secured to a rockshaft 282 extending transversely of the machine and journaled in suitable bearings on the side frame 9 and at the center of the machine.

Fixed on the rockshaft 282 and forming part of the arm 281 is an arm 283 which is pivotally connected with a spring-pressed rod 284 (Fig. 1) which, together with the cam operated arm 281 acts to rock said shaft. Another arm 285 is pivotally connected with one end of a rod 286, the opposite end of which is pivotally connected with an arm 287 of a bell crank that is pivoted at 288 on the side frame 9 of the machine (Fig. 18). The other arm 289 of the last named bell crank carries on its outer end a striker plate 290 which, when the packer fingers 295 pass upwardly around the sprocket 269, strikes a roller 291, turns said fingers upwardly through the trough to a vertical position therein and forces roller 278 between a pair of guides 296 hereinafter referred to.

The roller 291 is journaled on a crank arm 292 that is fixed on the shaft 274 at an angle of approximately 180° with the crank arm 277. When the packing fingers are turned upwardly and vertically as aforesaid, the roller 278 engages a plate 293 (Fig. 16) which is pivoted at 294 on one side of the trough 218. The swinging movement of this plate is limited by a pair of pins 295, and when the roller 278 passes said plate, the latter insures against dropping of the roller 278 rearwardly out of the guides 296. As the roller 278 travels along the guides 296, said guides act to hold the packing fingers 275 vertically during their entire travel along the trough 218. When the packer fingers reach the sprocket 271, the roller 278 passes out of the guides 296 and said fingers travel around said sprocket, and are turned as before described, by the cam 276. The upper reach of the chain 270 and the packer fingers 275 carried thereby are prevented from sagging or raising by upper and lower guides 297, one of which is bolted or otherwise suitably secured to brackets 297' (Fig. 16) the other secured to the trough 218. These guides 297 engage rollers 298 journaled on the shafts 274 and thus support the upper reach of the chain 270 and the packer fingers 275, while the latter are passing through the trough 218.

As each set of booklets is transferred into the trough 218, it passes a series of spring fingers 299 (Figs. 9, 16 and 19) which thereafter engage the set of booklets at the rear thereof and hold them up against a pair of the packing fingers 275 that have previously been turned upwardly and advanced a certain distance along the trough 218. These spring fingers 299 extend into the trough through openings 300 formed in the side walls thereof, and said spring fingers are bolted or otherwise suitably secured at 301 to said side walls of the trough. When the conveyor 173 is advanced to bring the next set of booklets to the transfer position, the conveyor 270 is likewise advanced a step whereupon the last named set of booklets is transferred back of the first set and held against said first set by the spring fingers 299. These operations are repeated until the desired number of booklets, here shown as eighteen sets, have been transferred back of one of the pairs of packing fingers 275, whereupon the next pair of packing fingers is turned upwardly and advanced as before described into engagement with the rear of the pack 8 of booklets. Another pack of booklets is then transferred back of the last named pair of packer fingers as before described, whereupon another pair of the packer fingers is turned upwardly and engaged with the back of the last pack of booklets. It will thus appear that the packs of booklets are packed between spaced pairs of the packer fingers successively and are successively advanced and delivered at the front of the trough 218 by said fingers.

BOOKLET DETECTING MECHANISM

*Figs. 1, 3, and 12*

The detector mechanism acts to prevent operation of the gathering and packing conveyors in the event that a folded and cut sheet is obstructed in its travel or does not reach the plate 170 at the proper time. This detector mechanism is controlled by the folded and cut sheet and the detecting element thereof may be placed at any desired point in the path of said sheet. As herein shown, the detector element is supported adjacent the last set of booklet advancing rollers 149, 149'. These rollers are formed with grooves 302 that provide for movement therein of the curved end 303 of the detector 304 (Fig. 12). The detector 304 is fixed on one end of a rockshaft 305 that extends transversely of the machine and is journaled in brackets 306 that are bolted or otherwise suitably secured on the swinging brackets 142'. Rocking movement of the detector 304 and the rockshaft 305 is limited as desired by a pair of set screws 307 between which the upper end 308 of the detector 304 extends. These set screws have threaded engagement in suitable openings formed in ears 309 that project laterally from the adjacent bracket 306 and are formed integrally therewith. Fixed on the opposite end of the rockshaft 305 adjacent the other bracket 306 is an arm 310 in which there is an adjusting screw 311 which forms contact with a spring-pressed rod 312. This rod 312 is pivotally connected at 313 with an arm 314 that is pivotally mounted at 315 on a stationary part of the machine.

The arm 314 has formed thereon a lug 316 that is adapted to engage the flattened end 317 of a pin 318 that projects laterally from one part of the pawl carrier arm 194 and extends over the pivoted arm 314. When a folded and cut sheet passes between the sheet advancing rollers 149, 149', one of the booklets 5 engages the curved end 303 of the detector 304 and swings it forwardly. The shaft 305 is thus rocked, and imparts rocking movement to the arm 310 so that the rod 312 is moved downwardly against the tension of the spring 319 and thereby compresses it. When the rod 312 moves downwardly, it moves the arm 314 downwardly, thereby disengaging the lug 316 from the flattened end 317 of the pin 318. The pawl carrier arm 194 which has previously been held up by engagement of the pin 318 with the arm 314, now rocks into position for engaging a tooth in the ratchet wheel 197 by the pawl 195 through pressure of spring 192. At this time the link 190 is moved rearwardly by the cam 187 and through engagement of said pawl with the ratchet 197, the latter and the shaft 196 are partially rotated to advance the gathering and packing mechanisms one step forward. These mechanisms are thus intermittently operated at predetermined intervals when the folded and cut sheets are delivered successively at proper intervals to the plate 170.

As soon as the folded and cut sheet passes between the rollers 149, 149' and out of engagement with the detector 304, the spring 319 acts to lift the rod 312 upwardly, thereby rocking the shaft 305 and swinging the detector 304 so that the curved end 303 thereof moves rearwardly in the grooves 302 of said rollers. When the rod 312 is lifted, it lifts the arm 314 so that the latter engages the pin 318 by means of lug 316. The pawl 195 is thus prevented from engaging the ratchet 197 until a sheet engages the detector, whereupon the mechanism connected therewith is operated as before described so that the gathering and packing mechanisms may be moved a step forward through engagement of the pawl 195 with a tooth of the ratchet 197.

MECHANISM FOR STITCHING INSET OR GATHERED SIGNATURES

*Figs. 21 and 22*

While there has been herein shown and described in detail a machine for producing groups of unstitched signatures for book or pamphlet purposes, and signatures each of which constitutes a booklet, the mechanism heretofore described for assembling the signatures into book or pamphlet form, or assembling the booklet-signature into groups has been of the so-called "gathering" type, in which the signatures or booklets have been assembled one behind the other in flat form. The mechanism for feeding and folding the book sheet and separating the same into its component signatures is, however, adapted for combination with means for assembling the signatures into inset or inserted form. Such a construction is shown in Fig. 21 in which there is mounted on the conveyor 173, in place of the gathering boxes 172, a series of V-shaped receptacles or receivers 320 which are progressed transversely of the machine and in a position to receive the signatures as they are fed downwardly to be assembled. The signatures so fed downwardly are deposited in the boxes 320 on their closed back, and as they are dropped into the receptacles 320 they automatically open so that, as the conveyor is moved transversely of the machine, the signatures are successively inset one within another until the desired number of signatures constituting the book have been so assembled. If desired, means for holding the signatures open in the receptacles 320 may be provided for the purpose of positively insuring the accuracy of the insetting operation. Any suitable mechanism for this purpose may be employed, but I have herein shown, for this purpose, a series of mechanical grippers 321 and 322 that are mounted on shafts 323 and 324. These shafts are operated by suitable cam mechanism not shown and are caused to engage the inside of opposite halves of the signatures after they are deposited in the receptacles to hold them open while succeeding signatures are deposited therein.

It is sometimes desirable to saddle-stitch the inserted signatures constituting a book at the terminus of the transverse movement of the conveyor 173, and in that event I preferably provide at 325 any suitable or well known stapling or stitching mechanism with its associated clinching anvil 326.

In order to properly present the book or pamphlet to the stitching mechanism, there is provided a guide or inverted saddle 327 that is provided with a point or advancing edge 328 around which the signature slides and is opened at the proper point and guided to proper position with respect to the stapling mechanism. In the event that the book is so stitched or stapled at this point, it is preferable to there deliver it rather than have it pass through the delivery mechanism in Fig. 9.

Similarly, there is illustrated in Fig. 22 a stapling mechanism for side stapling books of signatures (as shown in Fig. 7) and at the terminus of the transverse movement across the machine of the groups of signatures. In Fig. 22 the stapling mechanism 325', and its associated anvil 326', act to drive the staples through the books from top to bottom, any desired number of staples being placed in the book. In the event that this stapling or stitching of the gathered signatures is effected, it would likewise be desirable to deliver the same at this point rather than pass them through the delivery mechanism illustrated in Fig. 9.

It is sometimes desirable to form continuous or connected signatures from each sheet 6 and to gather and, if desired, stitch the gathered connected signatures together before separating or cutting the same. In this case, the cutters 134 would be dispensed with, and the continuous signatures gathered and thereafter separated or cut, preferably when delivered from the gathering mechanism (Fig. 7) or when stitched by the stitching mechanism (Figs. 21 and 22). If desired, the gathered continuous signatures, stitched or unstitched, could be separated by suitable mechanism for this purpose, or such signatures could be perforated and separated by hand.

Operation

The operation of the machine will be clearly understood from the foregoing and may be briefly summarized as follows. As each sheet 6 is advanced by the conveyor tapes 40, it strikes the fingers 51 which front register it with respect to the sheet folding mechanism. The sheet is then side registered by the slide 61 and the roller 62, whereupon the fingers 51 are lifted and the sheet is forwarded by the rollers 78 and 91 to the sheet folding mechanism where it receives any desired number of parallel folds. The sheet is folded in this mechanism as before described, and as the folded sheet passes between the last set of folding rollers 120, 123 said sheet is trimmed and cut by the cutters 134 into a series of signatures or booklets 5. The series is then advanced simultaneously by the sheet advancing mechanism to the plate 170 where said signatures are pushed by the pushers 171 onto the flights 172 of the gathering conveyor. The series thus folded and cut are fed successively to the plate 170 and gathered on the gathering or insetting mechanism as before described so that when each conveyor flight reaches the trough 218 it carries a set of the desired number of signatures or booklets. The sets are successively transferred from the successive flights of the conveyor by the reciprocating pusher 221, which delivers the sets successively between the packing fingers 275 of the booklet packing mechanism, or in the event that the flat-gathered or inset groups of signatures are stitched on the machine they may be delivered at this point. The packs 8 are intermittently advanced by the packing mechanism along the trough 218 and successively delivered to the front end thereof as before described.

From the foregoing, it will be appreciated that the present machine is capacitated for the expeditious production of signatures to which any desired number of parallel folds have been imparted, and the expeditious assembling of such signatures into book form, or, where each signature itself constitutes a booklet, into groups of the same; that the assembling of these signatures may be either in flat-gathered or inserted form by a conveyor which is herein shown as intermittently operated but which may be continuously operated; that the groups of signatures may be saddle-stitched if assembled in inserted relation, or side stitched if flat-gathered; and that said stitched or stapled groups may be delivered at the point at which they are stapled or stitched, or may, if desired, be passed through mechanisms that deliver them in groups.

In the foregoing description and in the appended claims, the terms "signature", "booklet" and "book" are to be regarded as interchangeable where it appears that the reference is to the product produced as the result of the operation of the separating means.

While one embodiment of the invention has been herein illustrated and described with more or less particularity, it is to be expressly understood that the invention is not limited to said embodiment or otherwise than by the terms of the appended claims.

What is claimed is:—

1. In apparatus of the character described, the combination of means for feeding, folding and separating a sheet into a plurality of signatures, and means for assembling said signatures on their folded edges with similarly disposed signatures of sheets successively fed, folded, and separated by said first named means.

2. In apparatus of the character described, means for feeding, folding and separating a sheet into a plurality of signatures, means for assembling said signatures, on their folded edges with similarly disposed signatures of sheets successively fed, folded, and separated by said first named means and means for stitching or stapling said signatures together.

3. In apparatus of the character described, means for feeding, folding and separating a sheet into a plurality of signatures, and signature receiving and assembling mechanism arranged transversely of said feeding, folding and separating means and adapted to assemble the signatures on their folded edges with similarly disposed signatures of sheets successively fed, folded, and separated by said first named means.

4. In apparatus of the character described, means for feeding, folding and separating a sheet into a plurality of signatures, signature receiving and assembling mechanism arranged transversely of said feeding, folding and separating means and adapted to assemble the signatures on their folded edges with similarly disposed signatures of sheets successively fed, folded, and separated by said first named means and means for stitching or stapling the assembled signatures.

5. In apparatus of the character described, means for feeding and registering a sheet, means for imparting to said sheet one or more parallel folds, means for separating said sheet into a plurality of signatures, conveying and assembling mechanism receiving said signatures and progressing the signatures received at one point to be associated with signatures received at other points, and detecting mechanism interposed between the sheet feeding mechanism and the sheet conveying and assembling mechanism.

6. In apparatus of the character described, means for feeding and registering a sheet, means for imparting to said sheet one or more parallel folds, means for separating said sheet into a plurality of signatures, conveying and assembling mechanism receiving said signatures and progressing the signatures received at one point to be associated with signatures received at other points, detecting mechanism interposed between the sheet feeding mechanism and the sheet conveying and assembling mechanism, and means for delivering a predetermined number of groups of signatures.

7. In apparatus of the character described, means for feeding, folding and separating a sheet into a plurality of signatures, means for trimming the lateral marginal extremities of the outermost signatures, means for removing the trimmed portions, and means for assembling the signatures.

8. In apparatus of the character described, means for successively folding sheets each having printed thereon matter for a plurality of signatures, means for cutting the successively folded sheets one after another to separate the signatures of each sheet, and means for successively gathering said signatures on their folded edges in sets each containing signatures from successive sheets folded and cut by said folding means and said cutting means.

9. In apparatus of the character described, means for successively folding sheets each having printed thereon matter for a plurality of signatures, means for cutting the successively folded sheets one after another to separate the signatures of each sheet, means for successively gathering said signatures on their folded edges in sets each containing signatures from successive sheets folded and cut by said folding means and said cutting means, and means for successively delivering said sets of signatures from said gathering means.

10. In apparatus of the character described, means for successively folding sheets each having printed thereon matter for a plurality of signatures, means for cutting the successively folded sheets one after another to separate the signatures of each sheet, means for successively gathering said signatures on their folded edges in sets each containing signatures from successive sheets folded and cut by said folding means and said cutting means, and means for successively delivering the sets of signatures in packs each containing a plurality of said sets.

11. In apparatus of the character described, means for successively folding sheets each having printed thereon matter for a plurality of signatures, means for cutting the successively folded sheets to separate the signatures of each sheet, means for successively gathering complete sets of the signatures, means for packing and delivering the sets of signatures successively from the apparatus, and means for transferring the sets of signatures successively from said gathering means to said packing and delivery means.

12. In apparatus of the character described, means for successively folding sheets each having printed thereon matter for a plurality of signatures, means for cutting the successively folded sheets one after another to separate the signatures of each sheet, means for successively gathering said signatures on their folded edges in sets each containing signatures from successive sheets folded and cut by said folding means and said cutting means, and means for advancing the pluralities of signatures successively from said cutting means to said gathering means.

13. In apparatus of the character described, means for successively folding sheets each having printed thereon matter for a plurality of signatures, means for cutting the successively folded sheets to separate the signatures of each sheet, means for successively gathering complete sets of the signatures, means for delivering the sets of signatures successively from the gathering means, and signature controlled means controlling the operation of said gathering means and said delivering means.

14. In apparatus of the character described, means for successively folding sheets each having printed thereon matter for a plurality of signatures, means for feeding the sheets successively to said folding means, means for cutting the successively folded sheets one after another to separate the signatures of each sheet, and means for successively gathering said signatures on their folded edges in sets each containing signatures from successive sheets folded and cut by said folding means and said cutting means.

15. In apparatus of the character described, means for folding successively fed sheets each having printed thereon matter for a plurality of signatures, means for registering the sheets with respect to said folding means, means for successively cutting the folded sheets one after another to separate the signatures of each sheet, and means for successively gathering said signatures on their folded edges in sets each containing signatures from successive sheets folded and cut by said folding means and said cutting means.

16. In apparatus of the character described, means for successively folding sheets each having printed thereon matter for a plurality of signatures, means for cutting the successively folded sheets one after another to separate the signatures of each sheet, and conveying and gathering mechanisms adapted to assemble said signatures on their folded edges in sets each containing signatures from successive sheets folded and cut by said folding means and said cutting means.

17. In apparatus of the character described, means for successively folding and cutting successively fed sheets into successive series of books, and means for successively gathering said signatures on their folded edges in sets each containing signatures from successive folded and cut series thereof.

18. In apparatus of the character described, means for successively folding and cutting successively fed sheets into successive series of signatures, mean for operating on the terminal signatures of each series so that all of the signatures produced have like binding dimensions, and means for successively gathering sets of said signatures from successive folded and cut series thereof.

19. In apparatus of the character described, means for successively folding and cutting successively fed sheets into series of books, means for producing signatures or books of like binding dimensions by trimming the lateral margins of the two outermost books or signatures, and means for successively gathering sets of said signatures from successive folded and cut series thereof.

20. In apparatus of the character described, an endless conveyor for gathering signatures, and means for delivering a series of aligned signatures simultaneously to said conveyor on their folded edges.

21. In apparatus of the character described, a gathering conveyor, means for feeding signatures vertically on edge to a point adjacent said conveyor, and means for pushing the signatures laterally from said point onto said conveyor so that the signatures stand on edge thereon while being gathered by the conveyor.

22. In apparatus of the character described, a gathering conveyor, means on the conveyor for holding signatures vertically on edge thereon, means for feeding signatures downwardly on edge to a point adjacent the conveyor, and means for pushing the signatures laterally from said point into said holding means.

23. In apparatus of the character described, a gathering conveyor having spaced flights adapted to support signatures standing on edge one behind the other, a plurality of pusher members movable toward and away from said flights and adapted to push the signatures successively thereon, means for successively feeding series of signatures vertically on edge between the conveyor flights and the pusher members, and means for alternately operating the pusher members and the conveyor whereby sets of signatures are successively gathered on the conveyor flights from the successive series of signatures fed by said feeding means.

24. In apparatus of the character described, a horizontally arranged gathering mechanism, and a set of substantially vertical tapes or belts adapted to simultaneously feed a series of signatures vertically to said gathering mechanism on their folded edges.

25. In apparatus of the character described, a roller and a set of substantially vertical driven tapes or belts, means for feeding series of signatures successively between the roller and the set of tapes or belts, and mechanism adapted to gathering successive sets of signatures from successive series thereof fed by said roller and said tapes or belts.

26. In apparatus of the character described, a support, means for simultaneously feeding a series of signatures thereon, a gathering conveyor adjacent said support, and means for simultaneously pushing the series of signatures from said support onto said gathering conveyor.

27. In apparatus of the character described, a set of spaced signature feeding tapes or belts, a gathering conveyor adjacent thereto, and members movable between the tapes or belts to push the signatures therefrom onto said gathering conveyor.

28. In apparatus of the character described, a support having spaced fingers thereon, a gathering conveyor at one side of the fingers, spaced tapes or belts at the opposite side of the fingers and adapted to simultaneously feed a series of signatures onto the support adjacent said fingers, and members movable between the tapes or belts and the fingers for pushing the signatures therethrough from said support onto said gathering conveyor.

29. In apparatus of the character described, a conveyor having a flight on which signatures are gathered, and means on the flight preventing accidental displacement of the signatures therefrom and providing for movement of the signatures onto and off of said flight.

30. In apparatus of the character described, a conveyor having a flight on which signatures are gathered, a detent on the flight, and means adapted to hold the signatures on the flight and providing for movement of said signatures onto and off of said flight past said detent.

31. In apparatus of the character described, a slide, a lever or the like pivoted thereon, signature transferring means carried by said lever, means for reciprocating said slide and the signature transferring means as a unit, and means for rocking said lever said signature transferring means on the slide.

32. In apparatus of the character described, packing mechanism, means for delivering signatures thereto, a signature pushing device, and means for reciprocating and rocking the signature pushing device whereby it may push signatures successively from said first named means onto said packing mechanism.

33. In apparatus of the character described, a packing conveyor, packing fingers pivoted at intervals thereon and between which signatures are received to be delivered in packs from the apparatus by said conveyor, guide means adjacent the conveyor, and means connected with the fingers for engaging said guide means to hold said fingers upwardly and retain the packs of signatures therebetween.

34. In apparatus of the character described, a packing conveyor, packing fingers pivoted at intervals thereon, means for holding the fingers upwardly to retain packs of signatures therebetween, and means for turning the fingers upwardly in succession.

35. In apparatus of the character described, a packing conveyor, a finger pivoted thereon and adapted to stand vertically, means for delivering signatures successively back of said finger, means for advancing the conveyor step by step as the signatures are delivered thereto, a second finger pivoted on the conveyor and adapted to stand vertically, and means for turning said second finger upwardly in back of the signatures to pack them between said fingers.

36. In apparatus of the character described, a sheet feeding roller, a drop roller movable toward and away from the sheet feeding roller and driven thereby, means for operating the drop roller, and a brake for the drop roller mounted on a part of said means and adapted to stop rotation of said drop roller when it is moved away from said sheet feeding roller.

37. In apparatus of the character described, sheet feeding means, a drop roller movable toward and away from the sheet feeding means and driven thereby, means for operating the drop roller, a brake for the drop roller pivoted on a part of said last named means and adapted to stop rotation of said drop roller when it is moved away from said sheet feeding means, spring means for impelling the brake against the drop of signatures from each sheet, intermittently operated mechanism adapted to form signature groups each from successive sheets folded and divided by said means, and stitching or stapling means to which a signature group is delivered by said mechanism at each step of operation thereof.

89. In apparatus of the character described, the combination of loop folding and sheet dividing means, mechanism adapted to assemble groups of signatures formed by said means, and means adapted to connect the signatures of each group together.

90. In apparatus of the character described, the combination of loop folding and sheet dividing means, mechanism extending transversely thereof and adapted to assemble signatures in groups each containing signatures from successive sheets folded and divided by said means, and means adjacent one end of said mechanism receiving the signature groups one after another therefrom and adapted to connect the signatures of each group together.

91. In apparatus of the character described, the combination of means for folding and dividing successive sheets to form a plurality of signatures from each sheet, mechanism adapted to flat gather the signatures in groups each containing signatures from successive sheets folded and divided by said means, and means for connecting the signatures of each group together.

92. In apparatus of the character described, the combination of means for folding and dividing successive sheets to form signatures therefrom, mechanism adapted to insert signatures formed by said means and thereby produce groups of signatures, and means for connecting the signatures of each group together.

In testimony whereof I have signed this specification.

EARL D. RADER.

the operation of said conveyor and said packing mechanism.

62. In combination, signature folding means including a grooved folding roller, a conveyor to which signatures are successively delivered from the signature folding means, a movable element extending in the groove of said roller and controlled by the presence or absence of a signature relative thereto, and mechanism controlled by said element and controlling the operation of said conveyor.

63. In combination, signature gathering and conveying means, signature packing mechanism adjacent thereto, and reciprocating and rocking means for transferring signatures successively from said signature gathering and conveying means to said packing mechanism.

64. In combination, an intermittently driven conveyor, means for delivering signatures to said conveyor each time the same is stopped whereby sets of signatures are successively assembled thereon, a packing mechanism, and means for transferring a set of signatures to said packing mechanism from the intermittently driven conveyor each time the latter is stopped.

65. In combination, an intermittently driven conveyor, means for delivering a series of aligned signatures to said conveyor each time the same is stopped whereby sets of signatures are successively assembled thereon, an endless packing mechanism arranged adjacent the conveyor, and means for transferring a set of signatures to said endless packing mechanism from said conveyor each time the latter is stopped.

66. In combination, an intermittently driven conveyor, means for delivering signatures to said conveyor each time the same is stopped whereby sets of signatures are successively assembled thereon, an intermittently driven packing conveyor which is stopped each time the first named conveyor is stopped, and means for transferring a set of signatures from said first named conveyor to the packing conveyor each time said conveyors are stopped.

67. In an apparatus of the character described, a feed roller, means for rotating it in opposite directions, a drop roller, and means for operating said drop roller and adapted to move it toward said feed roller when the latter is rotated in one direction and to move said drop roller away from the feed roller when it is rotated in the opposite direction.

68. In an apparatus of the character described, a shaft, a feed roller fixed thereon, a gear fixed on the shaft, a segmental arcuate shaped rack meshing with said gear and means for rocking the rack to rotate the gear, the shaft, and said roller as a unit in opposite directions.

69. In an apparatus of the character described, a feed roller, means for rotating it in opposite directions, a drop roller, means for moving the drop roller toward and away from the feed roller as it is moved in opposite directions respectively, and a brake on a part of said last named means adapted to engage the drop roller when it is moved away from said feed roller.

70. In an apparatus of the character described, a feed roller, means for rotating it in opposite directions, a drop roller, means for moving the drop roller toward and away from the feed roller as it is moved in opposite directions respectively, a brake on a part of said last named means adapted to engage the drop roller when it is moved away from the feed roller, and means for disengaging said brake from the drop roller when it is moved toward said feed roller.

71. In an apparatus of the character described, loop folding mechanism, means for driving the rollers thereof, a rotatably mounted shaft, means for driving the shaft from one of said rollers, a plurality of sets of driven rollers interposed between the shaft and the loop folding mechanism and adapted to feed folded sheets therefrom, and a driving connection between said shaft and one roller of said plurality of sets.

72. In an apparatus of the character described, means for conveying signatures, means for delivering a plurality of signatures in alignment adjacent the signature conveying means, rocking means, and means on said rocking means adapted to push a series of delivered signatures simultaneously onto said signature conveying means.

73. In an apparatus of the character described, signature conveying means, mechanism for delivering a plurality of signatures in alignment adjacent the signature conveying means, pivoted arms, means for rocking the same, and a plurality of devices carried by said arms and adapted to push the series of aligned signatures simultaneously onto said signature conveying means.

74. In an apparatus of the character described, a trough or packer box, endless means movable therealong, means for delivering signatures successively to the trough or packer box, and devices secured one after another on the trough or packer box and adapted to hold the signatures in juxtaposed relation for feeding therealong by said endless means.

75. In an apparatus of the character described, a trough or packer box, endless means movable along the same, devices on the endless means for packing signatures in the trough or packer box, means for delivering the signatures successively to the trough or packer box whereby they may be packed therein between said devices, and means on the trough for retaining the signatures in position until a sufficient number of said signatures have been delivered thereon and engaged between said devices.

76. In an apparatus of the character described, a trough or packer box, endless means movable therealong, packing devices secured to the endless means at intervals along the same and movable thereby through the trough or packer box, means for delivering signatures successively to the trough or packer box between the packing devices, and yieldable means engaging signatures successively to hold them in position in the trough or packer box until a sufficient number of signatures have been delivered therein and engaged between a pair of said devices.

77. In an apparatus of the character described, endless means, packing devices pivoted thereon at intervals, a pivoted member arranged adjacent the path of travel of the endless means and the packing devices, and means for rocking said member into engagement with the packing devices successively whereby the latter are swung into operative position one after another.

78. In an apparatus of the character described, endless means, packing devices pivoted at intervals thereon, arms connected with the packing devices, and a rocking striker adapted to engage said arms successively and swing said devices into operative position one after another.

79. In an apparatus of the character described endless means, packing devices pivoted at intervals thereon, guide means, a device for rocking parts of the packing devices successively in one direction into engagement with the guide means, and means for preventing the packing devices from rocking in the opposite direction as said parts are successively engaged with said guide means.

80. In an apparatus of the character described, endless means, packing devices pivoted at intervals thereon, means for swinging the packing devices into operative position successively, guide means, arms on the packing devices and carrying rollers means for engaging the rollers successively with said guide means to hold the packing devices in operative position, and a pivoted element past which the rollers move to engage said guide means, said element preventing disengagement of the rollers from the guide means after they have been engaged therewith.

81. In apparatus of the character described the combination of means for folding sheets one after another, means for dividing the folded sheets successively to form a plurality of signatures from each sheet, mechanism adapted to assemble the signatures in groups each containing signatures from successive sheets folded and divided by said means, and means for stitching or stapling the signatures of each group together.

82. In apparatus of the character described, the combination of means for folding and dividing successive sheets to form a plurality of signatures from each sheet, mechanism adapted to gather the signatures in groups each containing signatures from successive sheets folded and divided by said means, and means to which the signature groups are fed one after another by said mechanism and adapted to connect the signatures of each group together.

83. In apparatus of the character described, the combinations of means for folding sheets one after another and adapted to make one or more parallel folds in each sheet, means for dividing the folded sheets successively to form a plurality of signatures from each sheet, mechanism adapted to gather the signatures in groups each containing signatures from successive sheets folded and divided by said means, and means for successively stitching or stapling the groups of signatures to connect the signatures of each group together.

84. In apparatus of the character described, the combination of means for folding and dividing successive sheets to form a plurality of signatures from each sheet, mechanism adapted to assemble the signatures in groups each containing signatures from successive sheets folded and divided by said means, and means adapted to side stitch or staple the groups of signatures to connect the signatures of each group together.

85. In apparatus of the character described, the combination of means for folding and dividing successive sheets to form a plurality of signatures from each sheet, mechanism adapted to assemble the signatures in groups, and means receiving the signature groups one after another from said mechanism and adapted to saddle stitch or staple the signatures of each group.

86. In apparatus of the character described, the combination of means for folding and dividing successive sheets to form a plurality of signatures from each sheet, means for stitching or stapling signatures together in individual groups, and mechanism for advancing the groups one after another to said stitching or stapling means and adapted to gather the groups each from successive sheets folded and divided by said first named means.

87. In apparatus of the character described, the combination of means for folding and dividing successive sheets to form a plurality of signatures from each sheet, means for stitching or stapling signatures together in individual groups, mechanism adapted to gather the groups each from successive sheets folded and divided by said first named means, and a conveyor forming part of said mechanism and adapted to advance said groups one after another to said stitching or stapling means.

88. In apparatus of the character described, the combination of means for folding and dividing successive sheets to form a plurality

CERTIFICATE OF CORRECTION.

Patent No. 1,882,895.            October 18, 1932.

EARL D. RADER.

It is hereby certified that error appears in the printed specification of the above numbered patent requiring correction as follows: Page 5, line 46, for "the" read "a"; page 6, line 59, for "142" read "142' "; page 12, line 49, claim 2, strike out the comma; line 52, insert a comma after "means"; and line 53, for "said" read "the assembled"; same page, line 74, claim 4, insert a comma after "means"; first occurence page 13, line 26, claim 11, for "delivery" read "delivering"; and line 99, claim 18, for "mean" read "means"; page 14, line 29, claim 25, for "gathering" read "gather"; page 18, line 46, claim 80, insert a comma after "rollers", and line 76, claim, 83, for "combinations" read "combination"; and that the said Letters Patent should be read with these corrections therein that the same may conform to the record of the case in the Patent Office.

Signed and sealed this 2nd day of May, A. D. 1933.

(Seal)                                               M. J. Moore,
                                                   Acting Commissioner of Patents.

CERTIFICATE OF CORRECTION.

Patent No. 1,882,895.  October 18, 1932.

EARL D. RADER.

It is hereby certified that error appears in the printed specification of the above numbered patent requiring correction as follows: Page 5, line 46, for "the" read "a"; page 6, line 59, for "142" read "142' "; page 12, line 49, claim 2, strike out the comma; line 52, insert a comma after "means"; and line 53, for "said" read "the assembled"; same page, line 74, claim 4, insert a comma after "means"; first occurence page 13, line 26, claim 11, for "delivery" read "delivering"; and line 99, claim 18, for "mean" read "means"; page 14, line 29, claim 25, for "gathering" read "gather"; page 18, line 46, claim 80, insert a comma after "rollers", and line 76, claim, 83, for "combinations" read "combination"; and that the said Letters Patent should be read with these corrections therein that the same may conform to the record of the case in the Patent Office.

Signed and sealed this 2nd day of May, A. D. 1933.

(Seal)

M. J. Moore,
Acting Commissioner of Patents.